United States Patent
Farley et al.

(10) Patent No.: US 12,231,468 B2
(45) Date of Patent: Feb. 18, 2025

(54) LCS RESOURCE POLICY ENFORCEMENT SYSTEM

(71) Applicant: Dell Products L.P., Round Rock, TX (US)

(72) Inventors: Douglas Lang Farley, Round Rock, TX (US); Ethan A. Kaley, North Kingstown, RI (US); Judith Furlong, Natick, MA (US); Geoffrey A. Reid, Littleton, MA (US); John Harwood, Boston, MA (US); Gaurav Chawla, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 207 days.

(21) Appl. No.: 17/866,351

(22) Filed: Jul. 15, 2022

(65) Prior Publication Data

US 2024/0022605 A1  Jan. 18, 2024

(51) Int. Cl.
*G06F 15/16* (2006.01)
*H04L 9/40* (2022.01)
*H04L 47/80* (2022.01)

(52) U.S. Cl.
CPC ............ *H04L 63/20* (2013.01); *H04L 47/80* (2013.01)

(58) Field of Classification Search
CPC ...................................... H04L 47/80
See application file for complete search history.

(56) References Cited

U.S. PATENT DOCUMENTS

| | | | |
|---|---|---|---|
| 7,366,784 B2* | 4/2008 | Ishizaki | H04L 12/4675 709/228 |
| 9,692,729 B1* | 6/2017 | Chen | H04L 45/04 |
| 10,367,802 B2 | 7/2019 | Koushik et al. | |
| 10,375,177 B1* | 8/2019 | Bretan | H04L 67/146 |
| 2010/0121827 A1* | 5/2010 | Amauba | H04L 41/0233 707/E17.014 |
| 2014/0201524 A1* | 7/2014 | Dittrich | G06F 21/45 713/165 |
| 2014/0325519 A1* | 10/2014 | Li | H04L 67/01 718/103 |
| 2015/0244643 A1* | 8/2015 | Kinoshita | H04L 41/0896 709/226 |
| 2017/0171164 A1* | 6/2017 | Alexander | H04L 9/3268 |
| 2020/0034206 A1* | 1/2020 | Dimitrov | G06F 9/5077 |

* cited by examiner

*Primary Examiner* — Hieu T Hoang
(74) *Attorney, Agent, or Firm* — Joseph Mencher

(57) ABSTRACT

A Logically Composed System (LCS) resource policy enforcement system includes resource devices coupled to an LCS provisioning administrator device, a client system, and an orchestrator device coupled to the resource devices and the client system. The orchestrator device uses a first subset of the resource devices to provide an LCS to the client system based on a workload intent provided by the client system, associates the LCS with a client identifier for the client system, and tags each of the first subset of the resource devices being used to provide the LCS with the client identifier. The orchestrator device then identifies a LCS policy for the LCS and applies the LCS policy to each of the first subset of the resource devices tagged with the client identifier to cause the LCS policy to be enforced on the client system and the LCS provisioning administrator device.

20 Claims, 11 Drawing Sheets

LCS RESOURCE POLICY ENFORCEMENT SYSTEM

BACKGROUND

The present disclosure relates generally to information handling systems, and more particularly to enforcing policies on Logically Composed Systems (LCSs) and the resource devices in information handlings system(s) that are used to provide those LCSs.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

While conventional information handling systems such as, for example, server devices and/or other computing devices known in the art have traditionally been provided with particular information handling systems components that configure it to satisfy one or more use cases, new computing paradigms provide for the allocation of resources from information handling systems and/or information handling system components for use in Logically Composed Systems (LCSs) that may be composed as needed to satisfy any computing intent/workload, and then decomposed such that those resources may be utilized in other LCSs. As such, users of the LCSs may be provided with LCSs that meet their current needs for any particular workload they require.

In many scenarios, it may be desirable to enforce policies on the access, security, use, and/or other operation of an LCS. However, while the enforcement of similar policies on the conventional server devices or other computing devices discussed above is relatively straight-forward, similar policy enforcement on LCSs can raise issues. For example, LCSs are often provided in multi-tenant/multi-client-device environments using Bare Metal Server (BMS) systems or other resource systems known in the art, with resource devices included within and/or outside of those resource systems (e.g., processing devices and memory devices on a motherboard in the BMS system used to provide an Operating System (OS) for the LCS, storage devices, networking devices, etc.) used to perform the functionality for the LCSs, and often dynamically changing over the time period in which the LCS is provided. As such, the enforcement of LCS policies to provide security, Qualify of Service (QoS), lifecycle management, and/or other policy considerations for an LCS is relatively complicated, particularly when the resource devices used to provide the LCS dynamically change over time.

Accordingly, it would be desirable to provide an LCS policy enforcement system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide an orchestrator engine that is configured to: provide, to a first client system using a first subset of a plurality of resource devices and based on a workload intent provided by the first client system, a first LCS; associate the first LCS with a first client identifier for the first client system; tag, with the first client identifier, each of the first subset of the plurality of resource devices being used to provide the first LCS; identify a first LCS policy for the first LCS; and apply the first LCS policy to each of the first subset of the plurality of resource devices tagged with the first client identifier to cause the first LCS policy to be enforced on the first client system and an LCS provisioning administrator device that is coupled to the plurality of resource devices.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
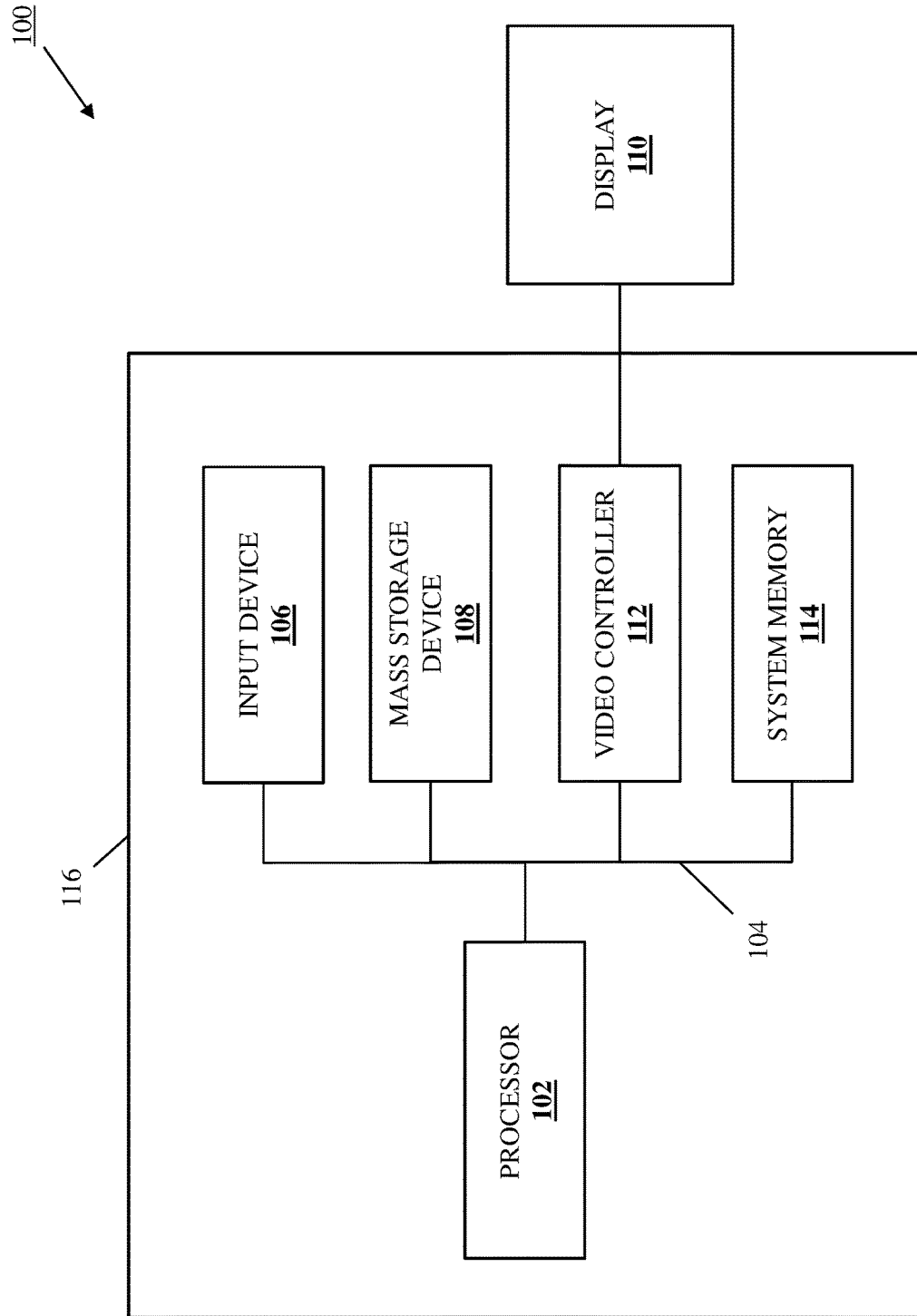
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

As discussed in further detail below, the Logically Composed System (LCS) resource policy enforcement systems and methods of the present disclosure may be utilized with LCSs, which one of skill in the art in possession of the present disclosure will recognize may be provided to users as part of an intent-based, as-a-Service delivery platform that enables multi-cloud computing while keeping the corresponding infrastructure that is utilized to do so "invisible" to the user in order to, for example, simplify the user/workload performance experience. As such, the LCSs discussed herein enable relatively rapid utilization of technology from a relatively broader resource pool, optimize the allocation of resources to workloads to provide improved scalability and efficiency, enable seamless introduction of new technologies and value-add services, and/or provide a variety of other benefits that would be apparent to one of skill in the art in possession of the present disclosure.

Figure 2:
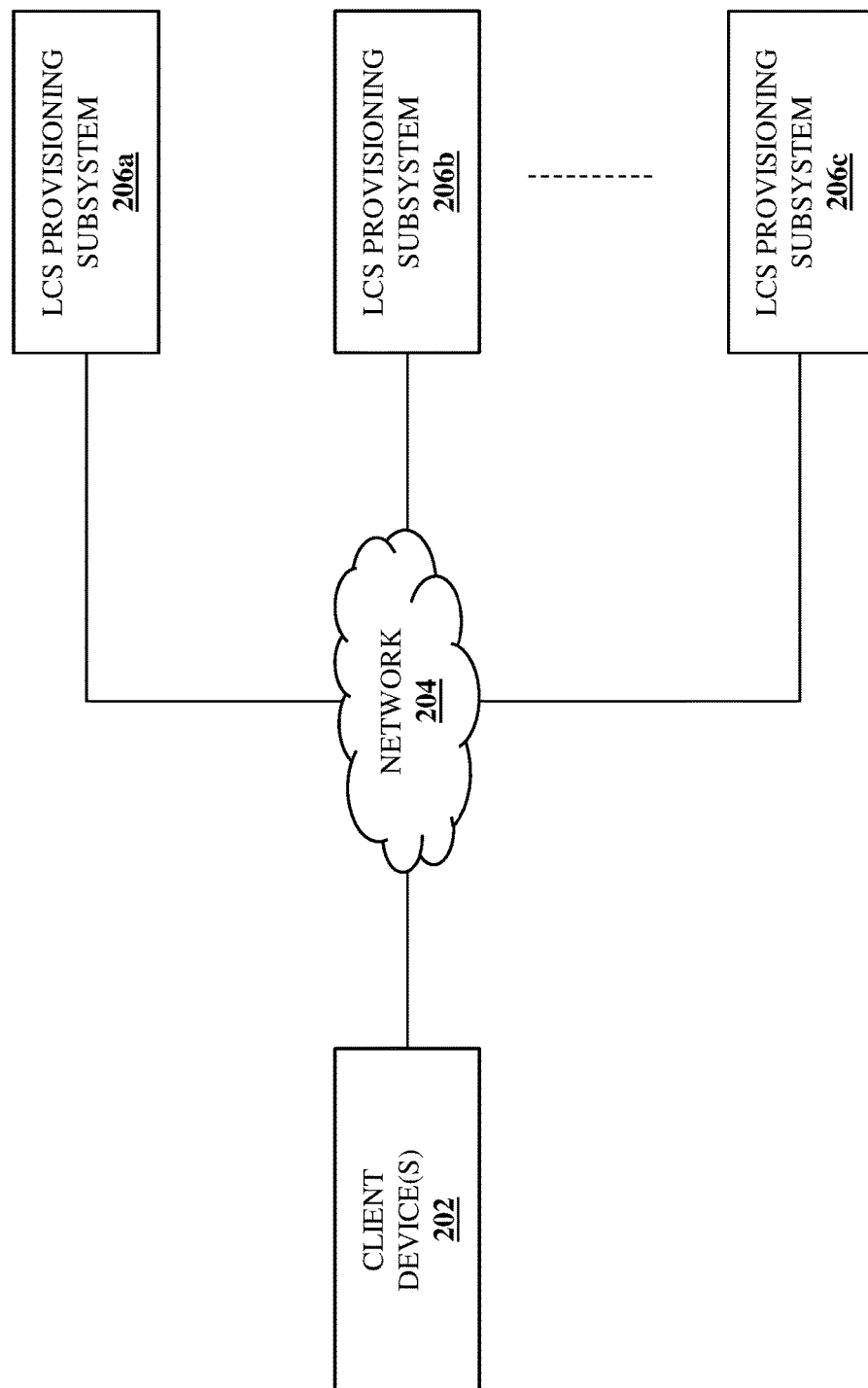
FIG. 2 is a schematic view illustrating an embodiment of an LCS provisioning system.

With reference to FIG. 2, an embodiment of an LCS provisioning system 200 is illustrated that may be utilized with the LCS resource policy enforcement systems and methods of the present disclosure. In the illustrated embodiment, the LCS provisioning system 200 includes one or more client devices 202. In an embodiment, any or all of the client devices may be provided by the IHS 100 discussed above with reference to FIG. 1 and/or may include some or all of the components of the IHS 100, and in specific examples may be provided by desktop computing devices, laptop/notebook computing devices, tablet computing devices, mobile phones, and/or any other computing device known in the art. However, while illustrated and discussed as being provided by specific computing devices, one of skill in the art in possession of the present disclosure will recognize that the functionality of the client device(s) 202 discussed below may be provided by other computing devices that are configured to operate similarly as the client device(s) 202 discussed below, and that one of skill in the art in possession of the present disclosure would recognize as utilizing the LCSs described herein. As illustrated, the client device(s) 202 may be coupled to a network 204 that may be provided by a Local Area Network (LAN), the Internet, combinations thereof, and/or any of network that would be apparent to one of skill in the art in possession of the present disclosure.

As also illustrated in FIG. 2, a plurality of LCS provisioning subsystems 206a, 206b, and up to 206c are coupled to the network 204 such that any or all of those LCS provisioning subsystems 206a-206c may provide LCSs to the client device(s) 202 as discussed in further detail below. In an embodiment, any or all of the LCS provisioning subsystems 206a-206c may include one or more of the IHS 100 discussed above with reference to FIG. 1 and/or may include some or all of the components of the IHS 100. For example, in some of the specific examples provided below, each of the LCS provisioning subsystems 206a-206c may be provided by a respective datacenter or other computing device/computing component location (e.g., a respective one of the "clouds" that enables the "multi-cloud" computing discussed above) in which the components of that LCS provisioning subsystem are included. However, while a specific configuration of the LCS provisioning system 200 (e.g., including multiple LCS provisioning subsystems 206a-206c) is illustrated and described, one of skill in the art in possession of the present disclosure will recognize that other configurations of the LCS provisioning system 200 (e.g., a single LCS provisioning subsystem, LCS provisioning subsystems that span multiple datacenters/computing device/computing component locations, etc.) will fall within the scope of the present disclosure as well.

Figure 3:
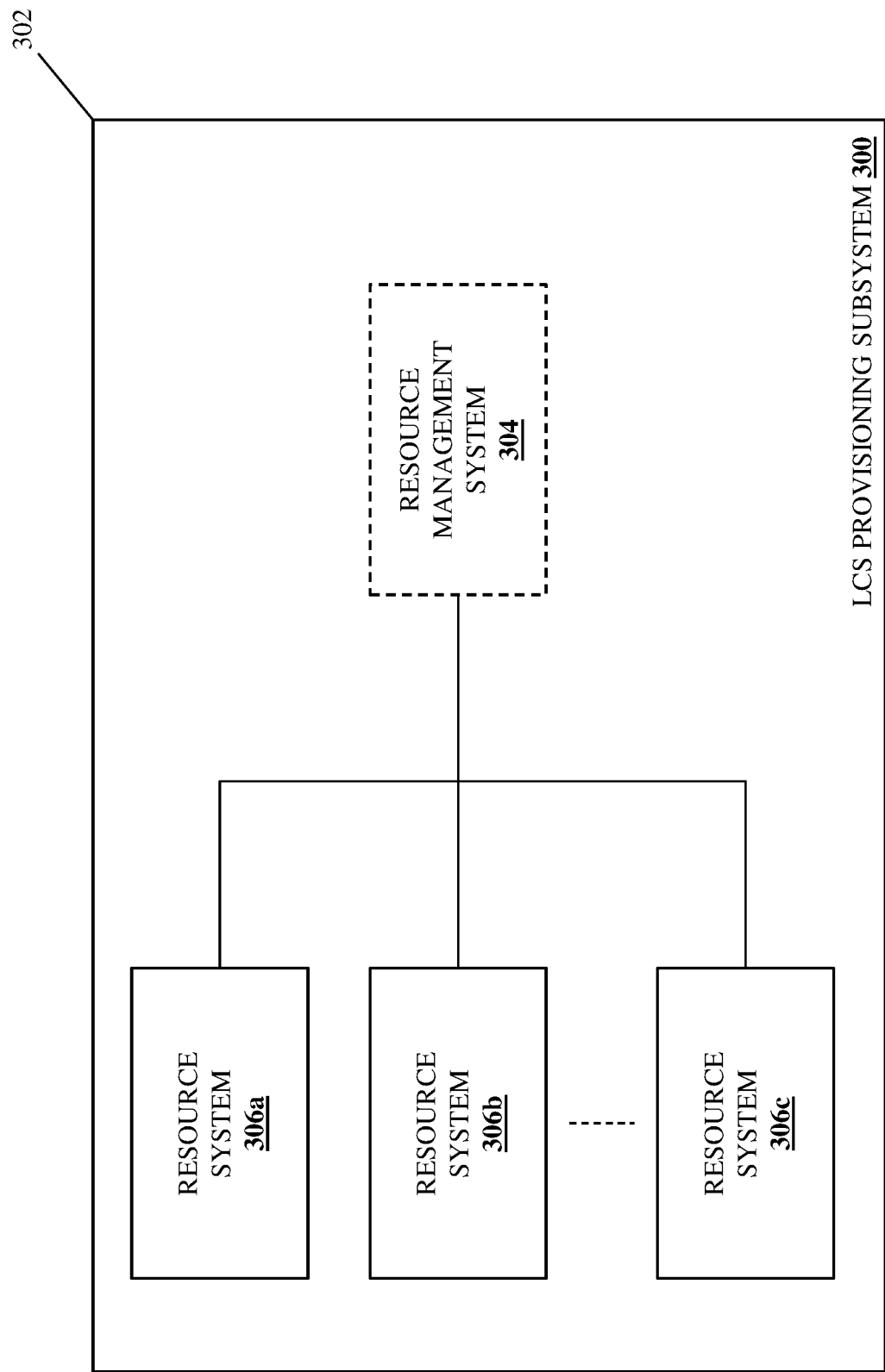
FIG. 3 is a schematic view illustrating an embodiment of an LCS provisioning subsystem that may be included in the LCS provisioning system of FIG. 2.

With reference to FIG. 3, an embodiment of an LCS provisioning subsystem 300 is illustrated that may provide any of the LCS provisioning subsystems 206a-206c discussed above with reference to FIG. 2. As such, the LCS provisioning subsystem 300 may include one or more of the IHS 100 discussed above with reference to FIG. 1 and/or may include some or all of the components of the IHS 100, and in the specific examples provided below may be provided by a datacenter or other computing device/computing component location in which the components of the LCS provisioning subsystem 300 are included. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

In the illustrated embodiment, the LCS provisioning subsystem 300 is provided in a datacenter 302, and includes a resource management system 304 coupled to a plurality of resource systems 306a, 306b, and up to 306c. In an embodiment, any of the resource management system 304 and the resource systems 306a-306c may be provided by the IHS 100 discussed above with reference to FIG. 1 and/or may include some or all of the components of the IHS 100. In the specific embodiments provided below, each of the resource management system 304 and the resource systems 306a-306c may include an orchestrator device. In some embodiments, the orchestrator device may be provided by the System Control Processor (SCP) device or Data Processing Unit (DPU) device discussed below, and may be conceptualized as an "enhanced" SmartNIC device that may be configured to perform functionality that is not available in conventional SmartNIC devices such as, for example, the resource management functionality, LCS provisioning functionality, and/or other SCP/DPU functionality described herein.

In an embodiment, any of the resource systems 306a-306c may include any of the resources described below coupled to an SCP device or DPU device that is configured to facilitate management of those resources by the resource management system 304. Furthermore, the SCP device or DPU device included in the resource management system 304 may provide an SCP Manager (SCPM) subsystem or DPU Manager (DPUM) subsystem that is configured to manage the SCP devices or DPU devices in the resource systems 306a-306c, and that performs the functionality of the resource management system 304 described below. In some examples, the resource management system 304 may be provided by a "stand-alone" system (e.g., that is provided in a separate chassis from each of the resource systems 306a-306c), and the SCPM subsystem or DPUM subsystem discussed below may be provided by a dedicated SCP device, DPU device, processing/memory resources, and/or other components in that resource management system 304. However, in other embodiments, the resource management system 304 may be provided by one of the resource systems 306a-306c (e.g., it may be provided in a chassis of one of the resource systems 306a-306c), and the SCPM subsystem or DPUM subsystem may be provided by an SCP device, DPU device, processing/memory resources, and/or any other any other components in that resource system.

As such, the resource management system 304 is illustrated with dashed lines in FIG. 3 to indicate that it may be a stand-alone system in some embodiments, or may be provided by one of the resource systems 306a-306c in other embodiments. Furthermore, one of skill in the art in possession of the present disclosure will appreciate how SCP devices or DPU devices in the resource systems 306a-306c may operate to "elect" or otherwise select one or more of those SCP devices or DPU devices to operate as the SCPM subsystem or DPUM subsystem that provides the resource management system 304 described below. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

Figure 4:
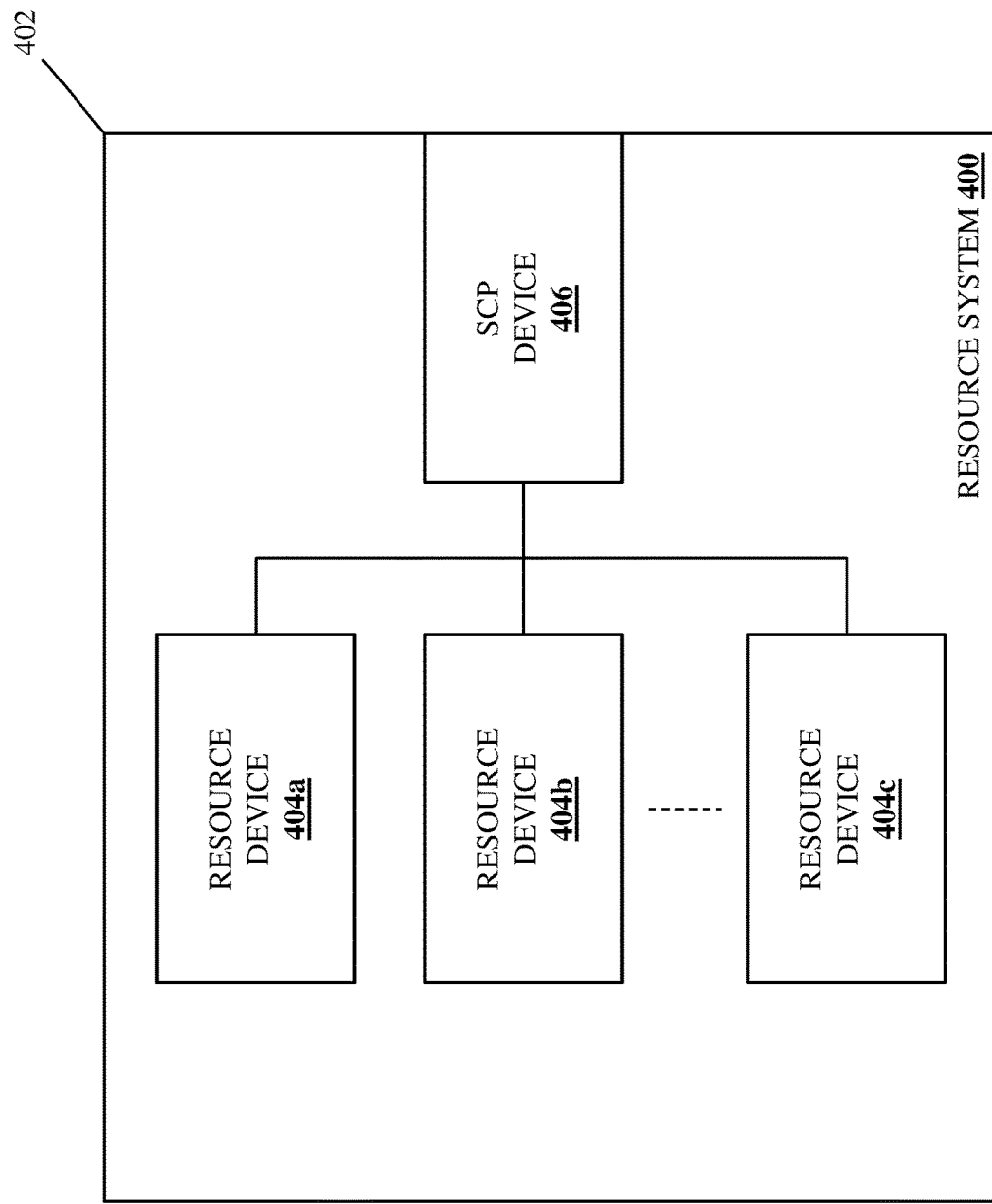
FIG. 4 is a schematic view illustrating an embodiment of a resource system that may be included in the LCS provisioning subsystem of FIG. 3.

With reference to FIG. 4, an embodiment of a resource system 400 is illustrated that may provide any or all of the resource systems 306a-306c discussed above with reference to FIG. 3. In an embodiment, the resource system 400 may be provided by the IHS 100 discussed above with reference to FIG. 1 and/or may include some or all of the components of the IHS 100. In the illustrated embodiment, the resource system 400 includes a chassis 402 that houses the components of the resource system 400, only some of which are illustrated and discussed below. In the illustrated embodiment, the chassis 402 houses an SCP device 406, but one of skill in the art in possession of the present disclosure will appreciate how the SCP device 406 may be replaced by the DPU device described herein while remaining within the scope of the present disclosure, with that DPU device provided by BLUEFIELD® DPU devices available from NVIDIA® Corporation of Santa Clara, California, United States, DPU devices available from FUNGIBLE® Inc. of Santa Clara, California, United States, and/or other DPU devices known in the art.

In an embodiment, the SCP device 406 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an SCP engine that is configured to perform the functionality of the SCP engines and/or SCP devices discussed below. Furthermore, the SCP device 406 may also include any of a variety of SCP components (e.g., hardware/software) that are configured to enable any of the SCP functionality described below.

In the illustrated embodiment, the chassis 402 also houses a plurality of resource devices 404a, 404b, and up to 404c, each of which is coupled to the SCP device 406. For example, the resource devices 404a-404c may include processing systems (e.g., first type processing systems such as those available from INTEL® Corporation of Santa Clara, California, United States, second type processing systems such as those available from ADVANCED MICRO DEVICES (AMD)® Inc. of Santa Clara, California, United States, Advanced Reduced Instruction Set Computer (RISC) Machine (ARM) devices, Graphics Processing Unit (GPU) devices, Tensor Processing Unit (TPU) devices, Field Programmable Gate Array (FPGA) devices, accelerator devices, etc.); memory systems (e.g., Persistence MEMory (PMEM) devices (e.g., solid state byte-addressable memory devices that reside on a memory bus), etc.); storage devices (e.g., Non-Volatile Memory express over Fabric (NVMe-oF) storage devices, Just a Bunch Of Flash (JBOF) devices, etc.); networking devices (e.g., Network Interface Controller (NIC) devices, etc.); and/or any other devices that one of skill in the art in possession of the present disclosure would recognize as enabling the functionality described as being enabled by the resource devices 404a-404c discussed below. As such, the resource devices 404a-404c in the resource systems 306a-306c/400 may be considered a "pool" of resources that are available to the resource management system 304 for use in composing LCSs.

To provide a specific example, the SCP devices described herein may provide a "trusted" orchestrator device that operates as a Root-of-Trust (RoT) for their corresponding resource devices/systems, to provide an intent management engine for managing the workload intents discussed below, to perform telemetry generation and/or reporting operations for their corresponding resource devices/systems, to perform identity operations for their corresponding resource devices/systems, provide an image boot engine (e.g., an operating system image boot engine) for LCSs composed using a processing system/memory system controlled by that SCP device, and/or perform any other operations that one of skill in the art in possession of the present disclosure would recognize as providing the functionality described below. For example, the SCP device 406 may be "trusted" because it provides a root-of-trust for its corresponding resource devices/systems, and thus may be configured with restricted access to its hardware and/or software that has been validated and is maintained within a closed-loop infrastructure. For example, the SCP device 704 may run cryptographically signed software validated via the root-of-trust, with connectivity to both a BMS BMC and the SCPM device discussed above, and with all communications internal to the closed-loop infrastructure secured to ensure their veracity.

To contrast, the DPU device described herein may provide an "untrusted" orchestrator device that may include similar hardware/software/capabilities as the SCP device 406, but a user of the SCP device 406 may not be able to access such hardware/software/capabilities on the SCP device 406 unless it is part of/connected to an authorized network. As will be appreciated by one of skill in the art in possession of the present disclosure, the DPU device may be "untrusted" due to it having not been manufactured by a manufacturer of the computing system 202 (e.g., it may be obtained by the manufacturer of the computing system 202 from any of a variety of vendors that are not controlled by the manufacturer of the computing system 202), it having not been secured based on a lack of control over the DPU device 204 by a manufacturer of the computing system 202, and/or based on other "untrusted" factors that would be apparent to one of skill in the art in possession of the present disclosure. As will be appreciated by one of skill in the art in possession of the present disclosure, a DPU device software stack differs from a conventional Input/Output (TO) card that uses firmware configured to provide dedicated I/O and management functions, as in addition to firmware, the DPU device software stack will include a DPU operating system and a user space that is customizable to configure/program the DPU device to present resource devices to an operating system in the computing system 202 outside the control of the manufacturer of the computing system, which can render that DPU device "untrusted" in many scenarios.

As discussed below, the SCP devices and/or DPU devices described herein may include Software-Defined Storage (SDS) subsystems, inference subsystems, data protection subsystems, Software-Defined Networking (SDN) subsystems, trust subsystems, data management subsystems, compression subsystems, encryption subsystems, and/or any other hardware/software described herein that may be allocated to an LCS that is composed using the resource devices/systems controlled by that SCP device. However, while an SCP device is illustrated and described as performing the functionality discussed below, one of skill in the art in possession of the present disclosure will appreciated that functionality described herein may be enabled on the DPU devices discussed above, as well as other devices with similar functionality, while remaining within the scope of the present disclosure as well.

Thus, the resource system 400 may include the chassis 402 including the SCP device 406 connected to any combinations of resource devices. To provide a specific embodiment, the resource system 400 may provide a "Bare Metal Server" that one of skill in the art in possession of the present disclosure will recognize may be a physical server system that provides dedicated server hosting to a single tenant, and thus may include the chassis 402 housing a processing system and a memory system, the SCP device 406, as well as any other resource devices that would be apparent to one of skill in the art in possession of the present disclosure. However, in other specific embodiments, the resource system 400 may include the chassis 402 housing the SCP device 406 coupled to particular resource devices 404a-404c. For example, the chassis 402 of the resource system 400 may house a plurality of processing systems (i.e., the resource devices 404a-404c) coupled to the SCP device 406. In another example, the chassis 402 of the resource system 400 may house a plurality of memory systems (i.e., the resource devices 404a-404c) coupled to the SCP device 406. In another example, the chassis 402 of the resource system 400 may house a plurality of storage devices (i.e., the resource devices 404a-404c) coupled to the SCP device 406. In another example, the chassis 402 of the resource system 400 may house a plurality of networking devices (i.e., the resource devices 404a-404c) coupled to the SCP device 406. However, one of skill in the art in possession of the present disclosure will appreciate that the chassis 402 of the resource system 400 housing a combination of any of the resource devices discussed above will fall within the scope of the present disclosure as well.

As discussed in further detail below, the SCP device 406 in the resource system 400 will operate with the resource management system 304 (e.g., an SCPM subsystem) to allocate any of its resources devices 404a-404c for use in a providing an LCS. Furthermore, the SCP device 406 in the resource system 400 may also operate to allocate SCP hardware and/or perform functionality, which may not be available in a resource device that it has allocated for use in providing an LCS, in order to provide any of a variety of functionality for the LCS. For example, the SCP engine and/or other hardware/software in the SCP device 406 may be configured to perform encryption functionality, compression functionality, and/or other storage functionality known in the art, and thus if that SCP device 406 allocates storage device(s) (which may be included in the resource devices it controls) for use in a providing an LCS, that SCP device 406 may also utilize its own SCP hardware and/or software to perform that encryption functionality, compression functionality, and/or other storage functionality as needed for the LCS as well. However, while particular SCP-enabled storage functionality is described herein, one of skill in the art in possession of the present disclosure will appreciate how the SCP devices 406 described herein may allocate SCP hardware and/or perform other enhanced functionality for an LCS provided via allocation of its resource devices 404a-404c while remaining within the scope of the present disclosure as well.

Figure 5:
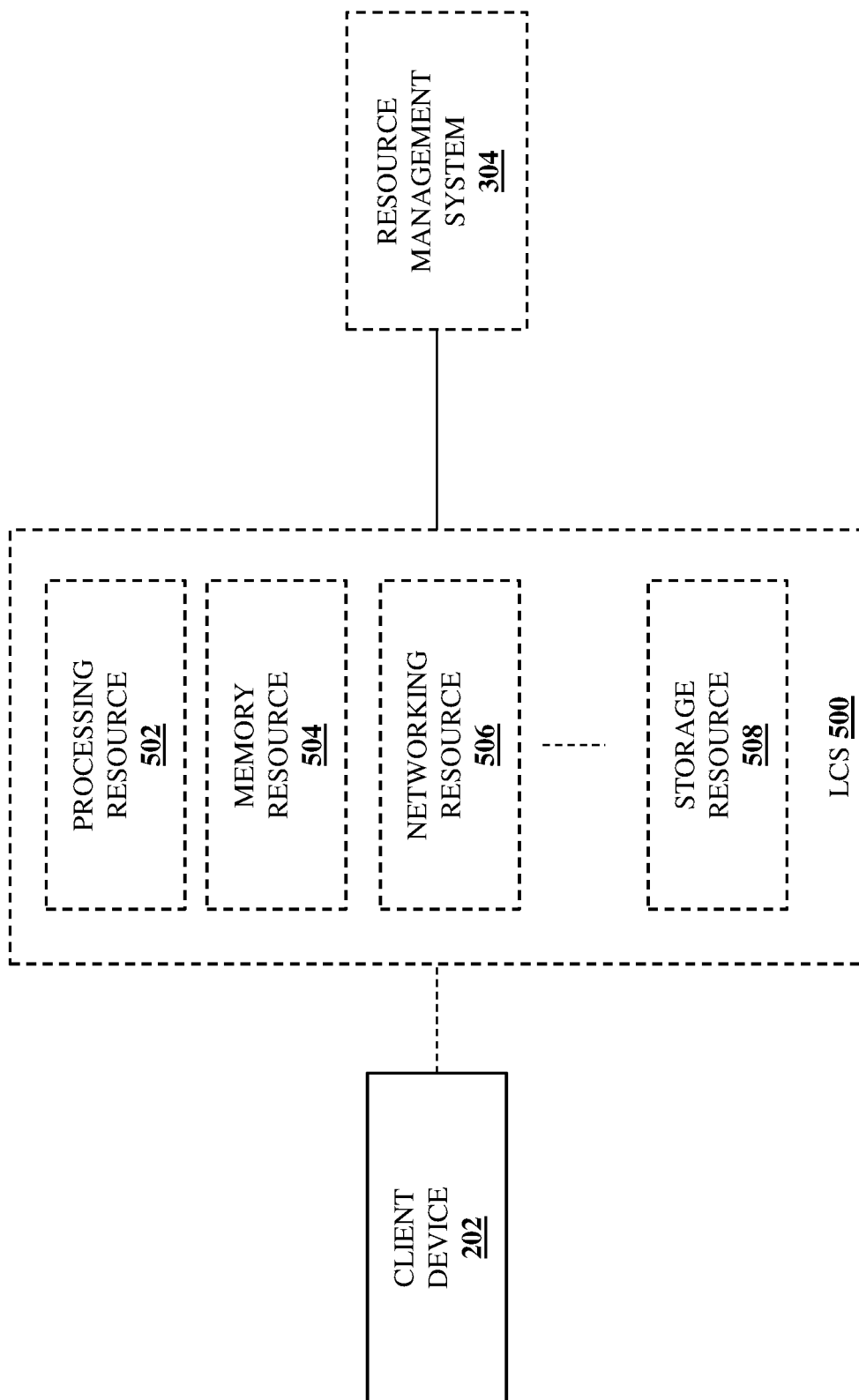
FIG. 5 is a schematic view illustrating an embodiment of the provisioning of an LCS using the LCS provisioning system of FIG. 2.

With reference to FIG. 5, an example of the provisioning of an LCS 500 to one of the client device(s) 202 is illustrated. For example, the LCS provisioning system 200 may allow a user of the client device 202 to express a "workload intent" that describes the general requirements of a workload that user would like to perform (e.g., "I need an LCS with 10 gigahertz (Ghz) of processing power and 8 gigabytes (GB) of memory capacity for an application requiring 20 terabytes (TB) of high-performance protected-object-storage for use with a hospital-compliant network", or "I need an LCS for a machine-learning environment requiring Tensorflow processing with 3 TB s of Accelerator PMEM memory capacity"). As will be appreciated by one of skill in the art in possession of the present disclosure, the workload intent discussed above may be provided to one of the LCS provisioning subsystems 206a-206c, and may be satisfied using resource systems that are included within that LCS provisioning subsystem, or satisfied using resource systems that are included across the different LCS provisioning subsystems 206a-206c.

As such, the resource management system 304 in the LCS provisioning subsystem that received the workload intent may operate to compose the LCS 500 using resource devices 404a-404c in the resource systems 306a-306c/400 in that LCS provisioning subsystem, and/or resource devices 404a-404c in the resource systems 306a-306c/400 in any of the other LCS provisioning subsystems. FIG. 5 illustrates the LCS 500 including a processing resource 502 allocated from one or more processing systems provided by one or more of the resource devices 404a-404c in one or more of the resource systems 306a-306c/400 in one or more of the LCS provisioning subsystems 206a-206c, a memory resource 504 allocated from one or more memory systems provided by one or more of the resource devices 404a-404c in one or more of the resource systems 306a-306c/400 in one or more of the LCS provisioning subsystems 206a-206c, a networking resource 506 allocated from one or more networking devices provided by one or more of the resource devices 404a-404c in one or more of the resource systems 306a-306c/400 in one or more of the LCS provisioning subsystems 206a-206c, and/or a storage resource 508 allocated from one or more storage devices provided by one or more of the resource devices 404a-404c in one or more of the resource systems 306a-306c/400 in one or more of the LCS provisioning subsystems 206a-206c.

Furthermore, as will be appreciated by one of skill in the art in possession of the present disclosure, any of the processing resource 502, memory resource 504, networking resource 506, and the storage resource 508 may be provided from a portion of a processing system (e.g., a core in a processor, a time-slice of processing cycles of a processor, etc.), a portion of a memory system (e.g., a subset of memory capacity in a memory device), a portion of a storage device (e.g., a subset of storage capacity in a storage device), and/or a portion of a networking device (e.g., a portion of the bandwidth of a networking device). Further still, as discussed above, the SCP device(s) 406 in the resource systems 306a-306c/400 that allocate any of the resource devices 404a-404c that provide the processing resource 502, memory resource 504, networking resource 506, and the storage resource 508 in the LCS 500 may also allocate their SCP hardware and/or perform enhanced functionality (e.g., the enhanced storage functionality in the specific examples provided above) for any of those resources that may otherwise not be available in the processing system, memory system, storage device, or networking device allocated to provide those resources in the LCS 500.

With the LCS 500 composed using the processing resources 502, the memory resources 504, the networking resources 506, and the storage resources 508, the resource management system 304 may provide the client device 202 resource communication information such as, for example, Internet Protocol (IP) addresses of each of the systems/devices that provide the resources that make up the LCS 500, in order to allow the client device 202 to communicate with those systems/devices in order to utilize the resources that make up the LCS 500. As will be appreciated by one of skill in the art in possession of the present disclosure, the resource communication information may include any information that allows the client device 202 to present the LCS 500 to a user in a manner that makes the LCS 500 appear the same as an integrated physical system having the same resources as the LCS 500.

Thus, continuing with the specific example above in which the user provided the workload intent defining an LCS with a 10 Ghz of processing power and 8 GB of memory capacity for an application with 20 TB of high-performance protected object storage for use with a hospital-compliant network, the processing resources 502 in the LCS 500 may be configured to utilize 10 Ghz of processing power from processing systems provided by resource device(s) in the resource system(s), the memory resources 504 in the LCS 500 may be configured to utilize 8 GB of memory capacity from memory systems provided by resource device(s) in the resource system(s), the storage resources 508 in the LCS 500 may be configured to utilize 20 TB of storage capacity from high-performance protected-object-storage storage device(s) provided by resource device(s) in the resource system(s), and the networking resources 506 in the LCS 500 may be configured to utilize hospital-compliant networking device(s) provided by resource device(s) in the resource system(s).

Similarly, continuing with the specific example above in which the user provided the workload intent defining an LCS for a machine-learning environment for Tensorflow processing with 3 TB s of Accelerator PMEM memory capacity, the processing resources 502 in the LCS 500 may be configured to utilize TPU processing systems provided by resource device(s) in the resource system(s), and the memory resources 504 in the LCS 500 may be configured to utilize 3 TB of accelerator PMEM memory capacity from processing systems/memory systems provided by resource device(s) in the resource system(s), while any networking/storage functionality may be provided for the networking resources 506 and storage resources 508, if needed.

Figure 6:
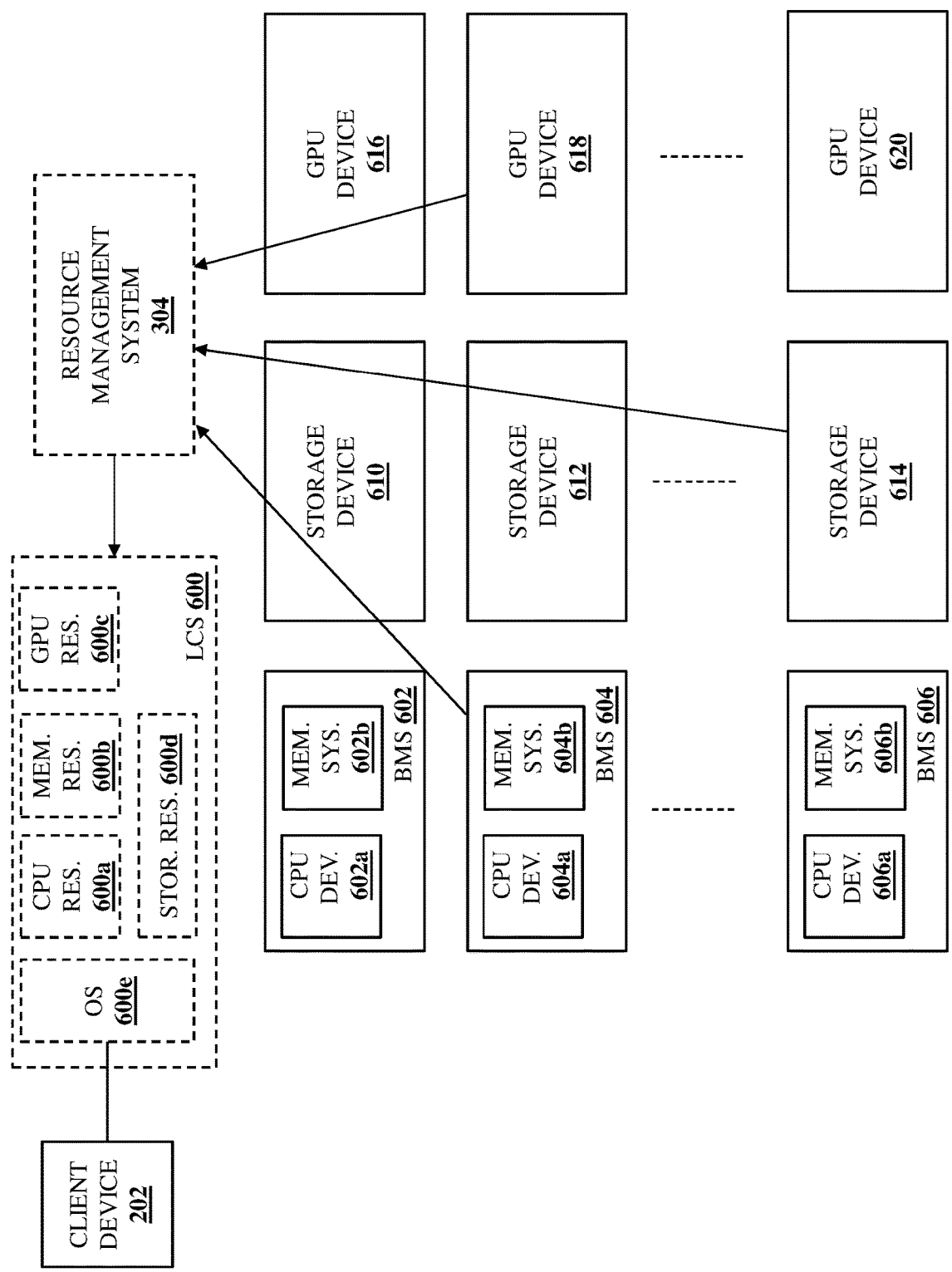
FIG. 6 is a schematic view illustrating an embodiment of the provisioning of an LCS using the LCS provisioning system of FIG. 2.

With reference to FIG. 6, another example of the provisioning of an LCS 600 to one of the client device(s) 202 is illustrated. As will be appreciated by one of skill in the art in possession of the present disclosure, many of the LCSs provided by the LCS provisioning system 200 will utilize a "compute" resource (e.g., provided by a processing resource such as an x86 processor, an AMD processor, an ARM processor, and/or other processing systems known in the art, along with a memory system that includes instructions that, when executed by the processing system, cause the processing system to perform any of a variety of compute operations known in the art), and in many situations those compute resources may be allocated from a Bare Metal Server (BMS) and presented to a client device 202 user along with storage resources, networking resources, other processing resources (e.g., GPU resources), and/or any other resources that would be apparent to one of skill in the art in possession of the present disclosure.

As such, in the illustrated embodiment, the resource systems 306a-306c available to the resource management system 304 include a Bare Metal Server (BMS) 602 having a Central Processing Unit (CPU) device 602a and a memory system 602b, a BMS 604 having a CPU device 604a and a memory system 604b, and up to a BMS 606 having a CPU device 606a and a memory system 606b. Furthermore, one or more of the resource systems 306a-306c includes resource devices 404a-404c provided by a storage device 610, a storage device 612, and up to a storage device 614. Further still, one or more of the resource systems 306a-306c includes resource devices 404a-404c provided by a Graphics Processing Unit (GPU) device 616, a GPU device 618, and up to a GPU device 620.

FIG. 6 illustrates how the resource management system 304 may compose the LCS 600 using the BMS 604 to provide the LCS 600 with CPU resources 600a that utilize the CPU device 604a in the BMS 604, and memory resources 600b that utilize the memory system 604b in the BMS 604. Furthermore, the resource management system 304 may compose the LCS 600 using the storage device 614 to provide the LCS 600 with storage resources 600*d*, and using the GPU device 318 to provide the LCS 600 with GPU resources 600*c*. As illustrated in the specific example in FIG. 6, the CPU device 604*a* and the memory system 604*b* in the BMS 604 may be configured to provide an operating system 600*e* that is presented to the client device 202 as being provided by the CPU resources 600*a* and the memory resources 600*b* in the LCS 600, with operating system 600*e* utilizing the GPU device 618 to provide the GPU resources 600*c* in the LCS 600, and utilizing the storage device 614 to provide the storage resources 600*d* in the LCS 600. The user of the client device 202 may then provide any application(s) on the operating system 600*e* provided by the CPU resources 600*a*/CPU device 604*a* and the memory resources 600*b*/memory system 604*b* in the LCS 600/BMS 604, with the application(s) operating using the CPU resources 600*a*/ CPU device 604*a*, the memory resources 600*b*/memory system 604*b*, the GPU resources 600*c*/GPU device 618, and the storage resources 600*d*/storage device 614.

Furthermore, as discussed above, the SCP device(s) 406 in the resource systems 306*a*-306*c*/400 that allocates any of the CPU device 604*a* and memory system 604*b* in the BMS 604 that provide the CPU resource 600*a* and memory resource 600*b*, the GPU device 618 that provides the GPU resource 600*c*, and the storage device 614 that provides storage resource 600*d*, may also allocate SCP hardware and/or perform enhanced functionality (e.g., the enhanced storage functionality in the specific examples provided above) for any of those resources that may otherwise not be available in the CPU device 604*a*, memory system 604*b*, storage device 614, or GPU device 618 allocated to provide those resources in the LCS 500.

However, while simplified examples are described above, one of skill in the art in possession of the present disclosure will appreciate how multiple devices/systems (e.g., multiple CPUs, memory systems, storage devices, and/or GPU devices) may be utilized to provide an LCS. Furthermore, any of the resources utilized to provide an LCS (e.g., the CPU resources, memory resources, storage resources, and/or GPU resources discussed above) need not be restricted to the same device/system, and instead may be provided by different devices/systems over time (e.g., the GPU resources 600*c* may be provided by the GPU device 618 during a first time period, by the GPU device 616 during a second time period, and so on) while remaining within the scope of the present disclosure as well. Further still, while the discussions above imply the allocation of physical hardware to provide LCSs, one of skill in the art in possession of the present disclosure will recognize that the LCSs described herein may be composed similarly as discussed herein from virtual resources. For example, the resource management system 304 may be configured to allocate a portion of a logical volume provided in a Redundant Array of Independent Disk (RAID) system to an LCS, allocate a portion/ time-slice of GPU processing performed by a GPU device to an LCS, and/or perform any other virtual resource allocation that would be apparent to one of skill in the art in possession of the present disclosure in order to compose an LCS.

Similarly as discussed above, with the LCS 600 composed using the CPU resources 600*a*, the memory resources 600*b*, the GPU resources 600*c*, and the storage resources 600*d*, the resource management system 304 may provide the client device 202 resource communication information such as, for example, Internet Protocol (IP) addresses of each of the systems/devices that provide the resources that make up the LCS 600, in order to allow the client device 202 to communicate with those systems/devices in order to utilize the resources that make up the LCS 600. As will be appreciated by one of skill in the art in possession of the present disclosure, the resource communication information allows the client device 202 to present the LCS 600 to a user in a manner that makes the LCS 600 appear the same as an integrated physical system having the same resources as the LCS 600.

As will be appreciated by one of skill in the art in possession of the present disclosure, the LCS provisioning system 200 discussed above solves issues present in conventional Information Technology (IT) infrastructure systems that utilize "purpose-built" devices (server devices, storage devices, etc.) in the performance of workloads and that often result in resources in those devices being underutilized. This is accomplished, at least in part, by having the resource management system(s) 304 "build" LCSs that satisfy the needs of workloads when they are deployed. As such, a user of a workload need simply define the needs of that workload via a "manifest" expressing the workload intent of the workload, and resource management system 304 may then compose an LCS by allocating resources that define that LCS and that satisfy the requirements expressed in its workload intent, and present that LCS to the user such that the user interacts with those resources in same manner as they would physical system at their location having those same resources.

Figure 7:
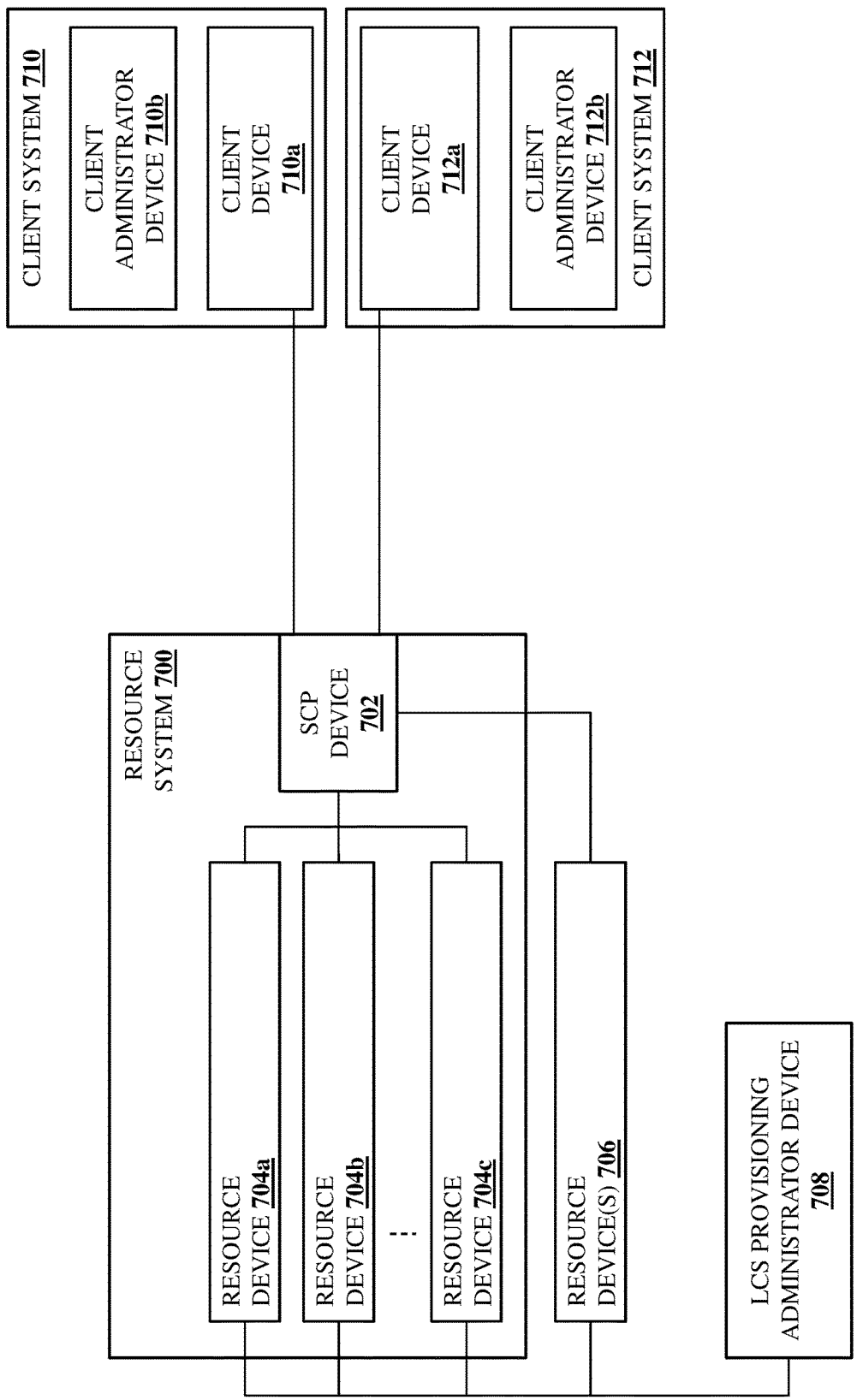
FIG. 7 is a schematic view illustrating an embodiment of an LCS resource policy enforcement system provided according to the teachings of the present disclosure.

Referring now to FIG. 7, an embodiment of an LCS resource policy enforcement system 700 that may be provided according to the teachings of the present disclosure is illustrated. In the illustrated embodiment, the LCS resource policy enforcement system 700 includes a resource system 700 that may be provided by any of the resource systems 306*a*-306*c* and/or 400, discussed above. In the illustrated embodiment, the resource system 700 includes a plurality of resource devices 704*a*, 704*b*, and up to 704*c*, any of which may be provided by the resource devices 404*a*-404*c*, discussed above. The resource system 700 also includes an orchestrator device that, in the examples illustrated and discussed below, is provided by an SCP device 702 that is coupled to the resource devices 704*a*-704*c*, but as discussed above may instead be provided by a DPU device and/or other orchestrator devices that would be apparent to one of skill in the art in possession of the present disclosure.

In the illustrated embodiment, the SCP device 702 is also coupled to one or more resource devices 706 that are located outside of the resource system 700, and one of skill in the art in possession of the present disclosure will appreciate how the resource device(s) 706 may be provided by any of the network-connected resource devices discussed above that may be accessible to an orchestrator device such as the SCP device 702. Furthermore, while not explicitly illustrated in FIG. 7, any of the resource devices 704*a*-704*c* and/or 706 may represent resource devices that are included on the SCP device 702 and that are available for use in providing an LCS (or functionality for an LCS) in the manners described above.

In the illustrated embodiment, the LCS resource policy enforcement system 700 also includes an LCS provisioning administrator device 708 that is illustrated as being coupled to each of the resource devices 704*a*-704*c* and 706, but one of skill in the art in possession of the present disclosure will appreciate how the LCS provisioning administrator device 708 may instead be coupled to the resource system that includes any resource device (rather than being coupled to the individual resource devices themselves as illustrated) while remaining within the scope of the present disclosure as well. As will be appreciated by one of skill in the art in possession of the present disclosure, the LCS provisioning system 200 discussed above with reference to FIG. 2, and/or each of the LCS provisioning subsystems 206a-206c/300, may include an administrator device that may provide the LCS provisioning administrator device 708 discussed in the examples below that operates to monitor/manage the resource systems/resource devices that are being used to provide LCSs. As such, while a single LCS provisioning administrator device 708 is illustrated for the resource system 700/resource devices 704a-704c and 706, one of skill in the art in possession of the present disclosure will appreciate how more than one LCS provisioning administrator device may provide the functionality of the LCS provisioning administrator device 708 discussed below (e.g., particularly when resource systems/resource devices in different LCS provisioning subsystems are used to provide an LCS).

In the illustrated embodiment, a pair of client systems 710 and 712 are illustrated as being coupled to the SCP device 702, but one of skill in the art in possession of the present disclosure will recognize that the coupling between the SCP device 702 and the client systems 710 and 712 may also include the SCPM devices, DPUM devices, and/or other LCS provisioning components described above. In the illustrated embodiment, the client system 710 includes a client device 710a that may be provided by any of the client devices 202 discussed above, and a client administrator device 710b that operates to monitor/manage the LCS being provided to the client device 710a. Similarly, the client system 712 includes a client device 712a that may be provided by any of the client devices 202 discussed above, and a client administrator device 712b that operates to monitor/manage the LCS being provided to the client device 712a. However, while a simplified example of the LCS resource policy enforcement system of the present disclosure is illustrated and described below, one of skill in the art in possession of the present disclosure will appreciate how the LCS resource policy enforcement system of the present disclosure may include different components and/or configurations (e.g., many more client systems than are illustrated in FIG. 7) while remaining within the scope of the present disclosure as well.

Figure 8:
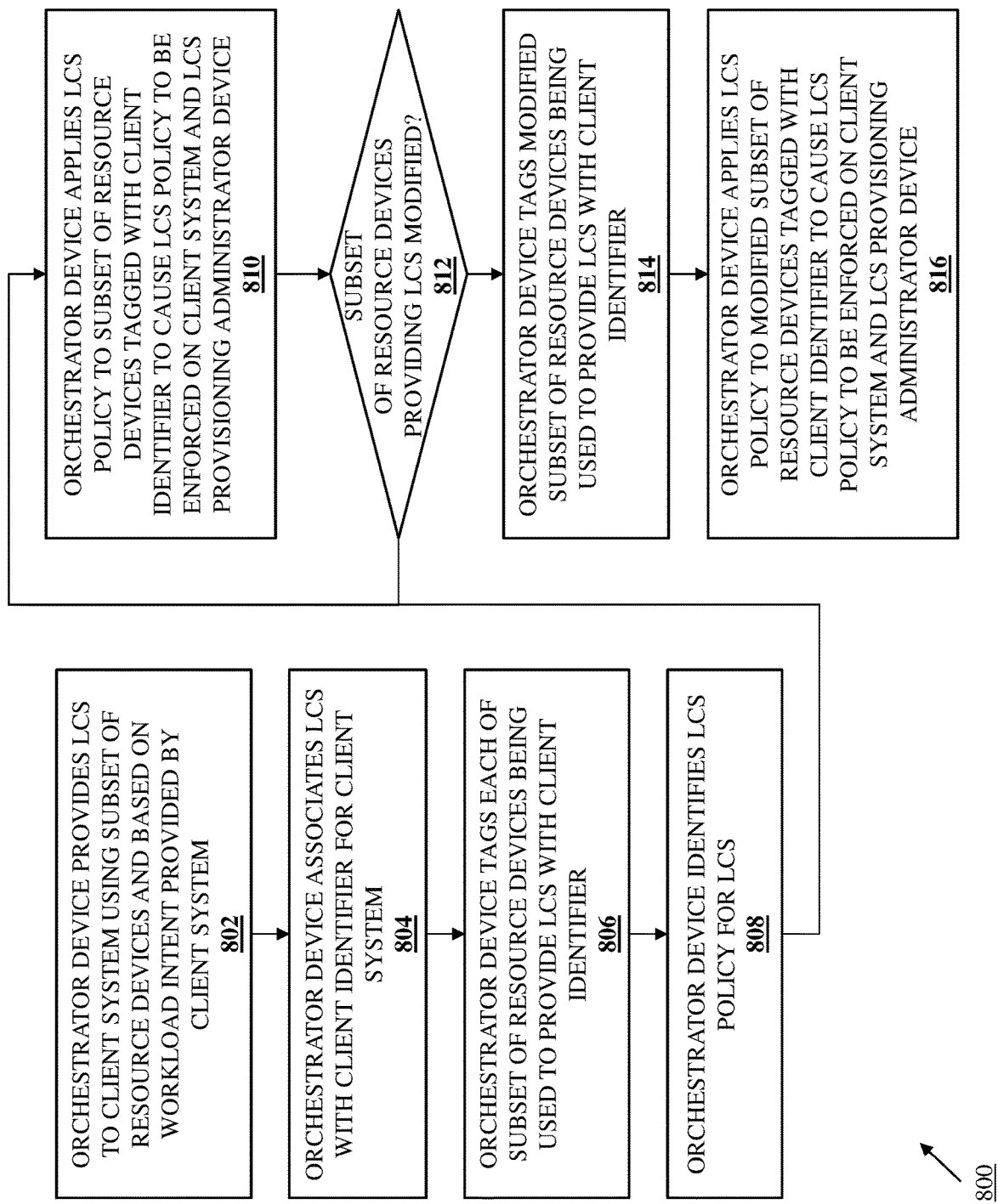
FIG. 8 is a flow chart illustrating an embodiment of a method for enforcing an LCS policy on resource devices used to provide an LCS.

Referring now to FIG. 8, an embodiment of a method 800 for enforcing a Logically Composed System (LCS) policy on resource devices used to provide an LCS is illustrated. As discussed below, the systems and methods of the present disclosure provide for the application of LCS policies for an LCS provided to a client system at a resource device level, allowing security policies, Quality of Service (QoS) policies, lifecycle management policies, and/or other LCS policies to be enforced on different entities that are configured to access different functionality associated with the LCS, even as the resource devices that are used to provide that LCS are modified. For example, the LCS resource policy enforcement system of the present disclosure may include resource devices coupled to an LCS provisioning administrator device, a client system, and an orchestrator device coupled to the resource devices and the client system. The orchestrator device uses a first subset of the resource devices to provide an LCS to the client system based on a workload intent provided by the client system, associates the LCS with a client identifier for the client system, and tags each of the first subset of the resource devices being used to provide the LCS with the client identifier. The orchestrator device then identifies a LCS policy for the LCS and applies the LCS policy to each of the first subset of the resource devices tagged with the client identifier to cause the LCS policy to be enforced on the client system and the LCS provisioning administrator device.

As discussed above, LCSs may be provided to client devices in a multi-tenant/multi-client-device environment, and the provisioning of any particular LCS to any particular client device may be defined by a service level for the client (e.g., a service level purchased by the client and defined by a Service Level Agreement (SLA)), a workload intent provided by the client, policies defined by the client and/or the LCS provisioning system, and/or other factors that would be apparent to one of skill in the art in possession of the present disclosure. Furthermore, such LCS policies will often be "per-tenant", "per-client-device", and/or "per-LCS", and thus will often differ across client systems, LCSs, LCS provisioning subsystems, and/or in other manners that will be apparent to one of skill in the art in possession of the present disclosure. For example, security policies may require different levels of security for LCSs, QoS policies may require different levels of service for LCSs, lifecycle management policies may allow different lifecycle management operations on LCSs and/or the resource devices used to provide them, etc. However, the composing and provisioning of a first LCS to a first tenant/client device in multi-tenant/multi-client-device environments may expose that first LCS and/or the first resource devices used to provide it to other tenants/client devices, client administrator devices, LCS provisioning administrator devices, and/or other entities.

As discussed below, the LCS resource policy enforcement systems and methods of the present disclosure address the issues discussed above by enabling end-to-end "slices" of resource devices to be "mapped" from an internal LCS provisioning fabric that includes the resource devices used to provide multiple LCSs to different tenants/client devices, through an orchestrator device, and to an external LCS consumption fabric in order to allow those resource devices to provide an LCS to a tenant/client device while enforcing an LCS policy for the LCS on any entities that have access to any functionality associated with that LCS. As discussed below, by composing the LCS using a subset of resource devices and tagging each of that subset of resource devices with a client identifier for the client device being provided the LCS, the LCS policy for the LCS may be identified and enforced on each of the subset of resource devices in a "per-slice" manner, allowing for isolation of that subset of resource devices in order to enforce security policies, monitoring and reporting of the operation of that subset of resource devices in order to enforce QoS policies, defining lifecycle management operations that may be performed on the LCS and/or the resource devices used to provide it in order to enforce lifecycle management policies, and/or to provide for the enforcement of any other LCS policies that would be apparent to one of skill in the art in possession of the present disclosure.

As discussed below, the LCS resource policy enforcement systems and methods of the present disclosure enable control via roles, entitlements, and/or other operations by any entities that are configured to access functionality associated with an LCS on a "per-LCS" basis, thus providing control over both accesses in the internal LCS provisioning fabric used to provide the LCS, and in the external LCS consumption fabric used to consume the LCS. As such, one of skill in the art in possession of the present disclosure will appreciate how any of a variety of global and/or local policies may be implemented to as part of the LCS policy described below, with all resource devices allocated for any particular LCS mapped via the client identifier discussed below in order to enforce the security isolation, QoS/SLA guarantees, and lifecycle management restrictions described herein. In a specific example, the Virtual Local Area Networks (VLANs) or similar technology, encryption, and physical/virtual functions described below may be implemented based on the physical connectivity being used to provide an LCS to both isolate that LCS and the resource devices used to provide it, while allows for the management of QoS provided by that LCS and lifecycle operations available for that LCS. As such, any resource device used to provide an LCS may be exposed as one of the physical/virtual function discussed above, which as discussed below facilitates the enforcement of the LCS policies described herein.

As such, an LCS policy for an LCS may be linked to a tenant/client device as part of (or in response to) the composing of the LCS (e.g., as part of the composition of the LCS in response to receiving the workload intent manifest provided by the client device as discussed above), allowing "LCS identifiers" such as the client identifier discussed below to be used to track resource devices used to create an LCS and provide that LCS over time. Furthermore, the LCS policy may include lifecycle management policies that define how lifecycle management operations may be performed on both resource devices used to provide the LCS and the LCS as well, thus ensuring that lifecycle management operations performed on resource devices by an LCS provisioning administrator device and lifecycle management operations performed on the LCS by a client device or client administrator devices conform to LCS lifecycle management restrictions. As discussed in further detail below, the enforcement of the LCS policies as described herein may include the generation of events/alerts per tenant/client device, LCS, or resource device based on, for example, LCS policy violations, and may provide the ability to isolate LCSs and/or their resource devices (e.g., via the VLAN-based isolation discussed below) for purposes of, for example, quarantining an LCS, tenant/client device, or resource device in the event of a security violation. As discussed below, the tagging of each of the resource devices used to provide an LCS (e.g., via the tagging of the physical/virtual functions that are used to present those resource devices) with the client identifier may be leveraged to enforce any LCS policy for the purposes of per-tenant/per-client-device isolation and configuration in the event of a security threat detection, allowing any subset of resource devices being used to provide an LCS to be quarantined (or their access revoked), and all associated events logged for auditing, analysis, etc.

Figure 9:
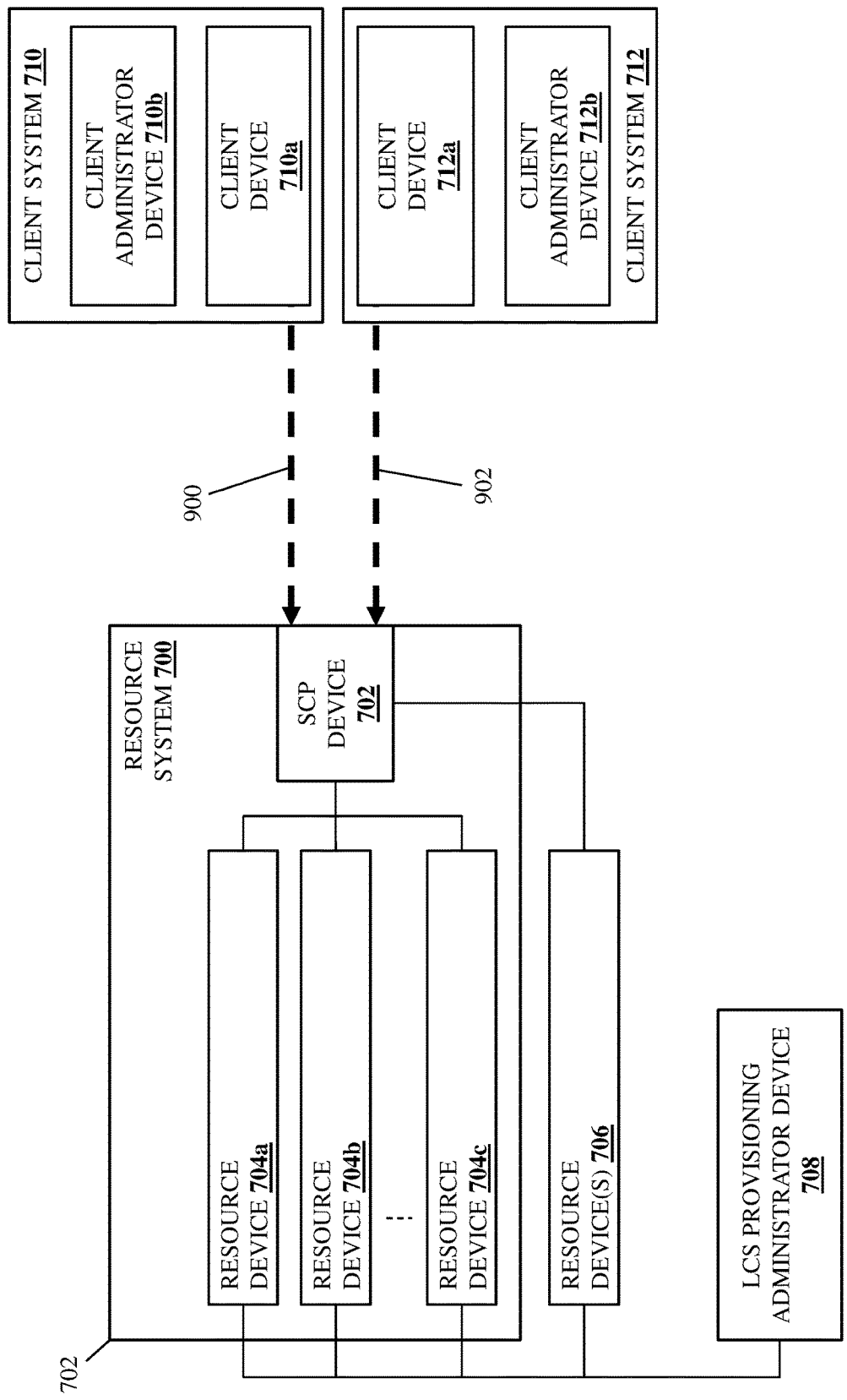
FIG. 9 is a schematic view illustrating an embodiment of the LCS resource policy enforcement system of FIG. 7 operating during the method of FIG. 8.

The method 800 begins at block 802 where an orchestrator device provides an LCS to a client system using a subset of resource devices and based on a workload intent provided by the client system. With reference to FIG. 9, in an embodiment of block 802, the client system 710 may perform LCS request operations 900 that include providing a request for an LCS to be provided to the client device 710a, and the client system 712 may perform LCS request operations 902 that include providing a request for an LCS to be provided to the client device 712a. As will be appreciated by one of skill in the art in possession of the present disclosure, the LCS request operations 900 and 902 are illustrated in FIG. 9 in dashed lines to indicate that the direct communication implied between the client systems 710 and 712 and the SCP device 702 in FIG. 9 is a simplification for purposes of clarity, and as discussed above the LCS request operations 900 and 902 also involve the resource management system 304 (e.g., an SCPM device as discussed above) receiving the workload intent from each of the client systems 710 and 712, selecting resource devices to compose respective LCSs based on those workload intents, and then operating with the SCP device 702 in order to provide those respective LCSs using those resource devices to the client devices 710a and 712a in the client systems 710 and 712, as well as any of the other LCS provisioning operations discussed in detail above.

Furthermore, one of skill in the art in possession of the present disclosure will appreciate how the LCS request operations 900 may be performed by either of the client device 710a or the client administrator device 710b in the client system 710, and how the how the LCS request operations 902 may be performed by either of the client device 712a or the client administrator device 712b in the client system 712. For example, the client devices 710a and 712a may request their LCS directly as discussed above, or may request their LCSs from their respective client administrator devices 710b and 712b that may then request those LCS from the LCS provisioning system.

In the examples provided below, the SCP device 702 uses the each of the resource devices 704a-704c and the resource device 706 in order to provide respective LCSs to the client devices 710a and 712a. However, while a specific situation is illustrated and described in which the same resource devices 704a-704c and 706 are used to provide two different LCSs to respective client systems 710 and 712, one of skill in the art in possession of the present disclosure will appreciate how different LCSs may (and often will) be provided by at least one different resource device from each other while remaining within the scope of the present disclosure. As such, while the discussion below includes the SCP device 702 providing a first LCS to the client system 710 using the resource devices 704a-704c and 706 and based on a first workload intent provided by the client system 710, and the SCP device 702 providing a second LCS to the client system 712 using the resource devices 704a-704c and 706 and based on a second workload intent provided by the client system 712, the LCS resource policy enforcement functionality may enforce policies for different LCSs provided using different resource devices while remaining within the scope of the present disclosure as well.

The method 800 then proceeds to block 804 where the orchestrator device associates the LCS with a client identifier for the client system. In an embodiment, at block 804, the SCP device 702 may identify a client identifier for the client system 710, and associate that client identifier with the LCS provided for that client system 710 using the resource devices 704a-704c and 706. Similarly, at block 804, the SCP device 702 may identify a client identifier for the client system 712, and associate that client identifier with the LCS provided for that client system 712 using the resource devices 704a-704c and 706. In some embodiments, the client identifiers identified for the client systems 710 and 712 may be provided by the client systems 710 and 712 via, for example, the workload intent manifests that provide the workload intents that were used to compose the LCSs for those client systems 710 and 712, and thus the identification of the client identifiers for the client systems 710 and 712 may be performed during the composition of those LCSs. In another embodiment, the client identifiers identified for the client systems 710 and 712 may be identified by the SCP device 702 via any database that is accessible to the SCP device 702 and using any client identifier lookup information (e.g., a username and password of a user of the client system) that would be apparent to one of skill in the art in possession of the present disclosure. However, while specific examples of the identification of client identifiers have been provided, one of skill in the art in possession of the present disclosure will appreciate how the client identifiers utilized in the LCS resource policy enforcement system of the present disclosure may be identified using any of a variety of techniques that would be apparent to one of skill in the art in possession of the present disclosure.

In an embodiment, the SCP device 702 may associate the respective client identifiers for the client systems 710 and 712 with the respective LCSs provided for those client systems 710 and 712 in an SCP database in the SCP device 702. As discussed above, the SCP device 702 may operate to allocate functionality of the resource devices 704a-704c and 706 for use in providing the respective LCSs to the client systems 710 and 712, and thus may include an SCP database that enables the client identifiers for those client systems 710 and 712 to be associated with functionality allocated from the resource devices 704a-704c and 706 to those respective LCSs. For example, the association of a client identifier with resource device functionality allocated to an LCS as described above may allow any functionality performed by a resource device for an LCS (as instructed by its corresponding client system as discussed above) to reference that client identifier. To provide a specific example, any LCS instruction received from a client device system by the SCP device 702 may result in the SCP device 702 retrieving the client identifier associated with that LCS from its SCP database, instructing the resource device(s) to utilize its allocated functionality to perform the requested LCS instruction, and providing the result of the performance of that requested LCS instruction along with the client identifier in order to ensure the LCS (i.e., any functionality performed by the resource devices used to provide that LCS) is associated with the client identifier.

In an embodiment, the client identifier discussed above may be provided by a transaction identifier such as a Universally Unique Identifier (UUID) that may be created when a client device provides a workload intent and a corresponding LCS is created as discussed above. As will be appreciated by one of skill in the art in possession of the present disclosure, the use of the transaction identifier discussed above may allow for any corresponding LCS (and the resource devices used to provide it) to be identified as "belonging to", operating on behalf of, or otherwise being utilized to provide the LCS. Furthermore, as the LCS operations are performed for the LCS, the transaction identifier (e.g., a UUID) may be used to identify the resource devices and any associated policies provided for the operations of the LCS. As will be appreciated by one of skill in the art in possession of the present disclosure, some LCS operations may be static (e.g., the creation of a storage volume), while some LCS operations may be dynamic (e.g., movement of data, limiting use of the capacity of a resource device, etc.), and a localized database may provide a repository for a rule-based engine to connect the transaction identifier to rules/policies for the LCS in order to allow for the enforcement of those rules/policies.

Figure 10:
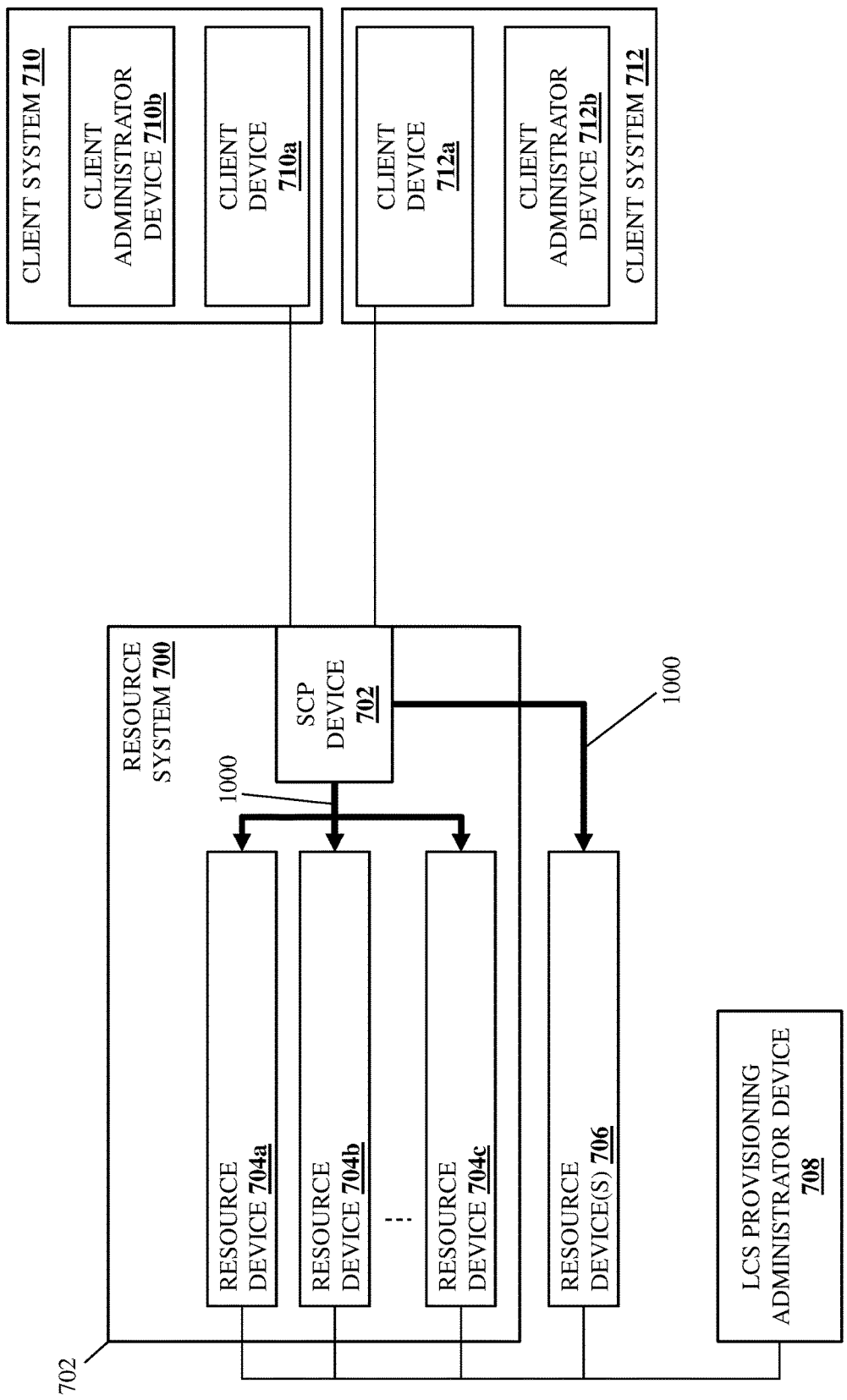
FIG. 10 is a schematic view illustrating an embodiment of the LCS resource policy enforcement system of FIG. 7 operating during the method of FIG. 8.

The method 800 then proceeds to block 806 where the orchestrator device tags each of the subset of resource devices being used to provide the LCS with the client identifier. With reference to FIG. 10, in an embodiment of block 806, the SCP device 702 may perform resource device tagging operations 1000 in order to tag each of the resource devices 704a-704c and 706 used to provide LCSs with the client identifier for the client system to which that LCS is being provided. For example, the resource device tagging operations 1000 may include the SCP device 702 tagging each of the resource devices 704a-704c and 706 (or portion of those resource devices 704a-704c and 706) used to provide the LCS for the client system 710 with the client identifier for the client system 710, and the SCP device 702 tagging each of the resource devices 704a-704c and 706 (or portion of those resource devices 704a-704c and 706) used to provide the LCS for the client system 712 with the client identifier for the client system 712.

For example, as discussed above, each resource device or portion of that resource device that is used to provide an LCS may be presented as a physical or virtual function (e.g., a PCIe function) for the LCS, and the tagging of that resource device (or portion thereof) with a client identifier may be performed by associating that client identifier with that physical or virtual function. For example, a tag or other client identifier may be provided in a metadata field in order to map the LCS and its associated resource devices to the transaction identifier discussed above and any associated polic(ies). Furthermore, the identities of the resource devices utilized to provide the LCS may be stored in a database along with the rules or other information that define the polic(ies) for the operation of that LCS. Thus, the resource devices that provide the LCS may be tagged with the metadata-based identifier in order to allow for indexing into the rules/policies for the LCS in order to define the operation of those resource devices.

In some examples, such metadata-based identifiers may be stored in the SCP database of the SCP device, in a storage device configuration, in storage volume information, in network configuration elements, and/or in other locations that would be apparent to one of skill in the art in possession of the present disclosure. In other examples, the configuration for the network for the LCS may be generated and stored in similar manners (e.g., mapping ports to resource-device-provided services under a metadata tag). For example, the tags discussed above may be stored in the network configuration to partition a switch device or NIC device, set ports and limits, map virtual functions and services to LCSs, and/or provide other functionality that would be apparent to one of skill in the art in possession of the present disclosure. In another example, tags may be used with LCS scheduling/migration policies such that, when an LCS cannot meet a policy (e.g., a Service Level Agreement (SLA)), the scheduling of the LCS (or the resource devices used to provide it) may be changed by, for example, migrating the LCS to another BMS system and/or using different resource devices to provide that LCS (with the new LCS provided tags/identifiers for the new BMS system and able to connect to the same or new resource devices). As such, the orchestrator device or resource system may link tags, policy tables for the LCS, the SCP device, the network configuration for the LCS, the storage resources that provide the LCS, and/or any other subsystems utilized to provide the LCS together in order to provide for the enforcement of LCS policies.

As such, one of skill in the art in possession of the present disclosure will appreciate how any interactions with resource devices, operation of resource devices, and/or other functionality associated with resource devices may reference the client identifier used to tag those resource devices. However, while a specific example of the tagging of resource devices with a client identifier has been described, one of skill in the art in possession of the present disclosure will appreciate how the resource devices being used to provide an LCS for a client system may be associated with that client system in a variety of manners that will fall within the scope of the present disclosure as well.

To provide a specific example, a resource device used to provide an LCS may include a networking device such as a Network Interface Controller (NIC) device. While in some embodiments a NIC device may be physically partitionable such that those physical partitions may be tagged as described above, other embodiments may include NIC devices that are not physically partitionable. However, such a NIC device may still allow for the tagging discussed above using data flow tracking techniques in order to, for example, identify LCS access operations via the NIC device, ensure ingress and egress by particular resource devices through ports on the NIC device that are dedicated to providing an LCS, and allow the LCS policies discussed below to be enforced to ensure bandwidth of the NIC device for an LCS, determine how much bandwidth of the NIC device is being used to provide the LCS, etc. As such, one of skill in the art in possession of the present disclosure will appreciate how the tagging operations described above may be enabled in a variety of manner in order to provide for the LCS resource policy enforcement functionality described herein.

The method 800 then proceeds to block 808 where the orchestrator device identifies an LCS policy for the LCS. In an embodiment, at block 808, the SCP device 702 may identify a respective LCS policy for each LCS being provided to the client systems 710 and 712, respectively. For example, an LCS policy for an LCS may include an LCS security policy that defines access to different functionality associated with that LCS, an LCS QoS policy that defines how QoS associated with an LCS may be managed in both the internal LCS provisioning network that is providing the LCS and the external LCS consumption network that is consuming the LCS, an LCS lifecycle management policy that defines how lifecycle management operations may be performed on the LCS and/or the resource devices being used to provide that LCS, as well as any other LCS policy factors that would be apparent to one of skill in the art in possession of the present disclosure.

In an embodiment, the LCS policy for an LCS may be identified from one or more sources, with the LCS security policies discussed above defined by the LCS provisioning system and/or the client system that is being provided the LCS, the LCS QoS policies discussed above defined by an SLA between the LCS provisioning system and the client system being provided the LCS, the LCS lifecycle management policies discussed above defined by the LCS provisioning system, etc. As such, upon composition and provisioning of the LCS for a client system, the SCP device 702 may operate to obtain LCS policy information from one or more sources in order to identify the LCS policy for that LCS that may include the LCS security policies, LCS QoS policies, LCS lifecycle management policies, and/or other LCS policies that would be apparent to one of skill in the art in possession of the present disclosure.

Figure 11:
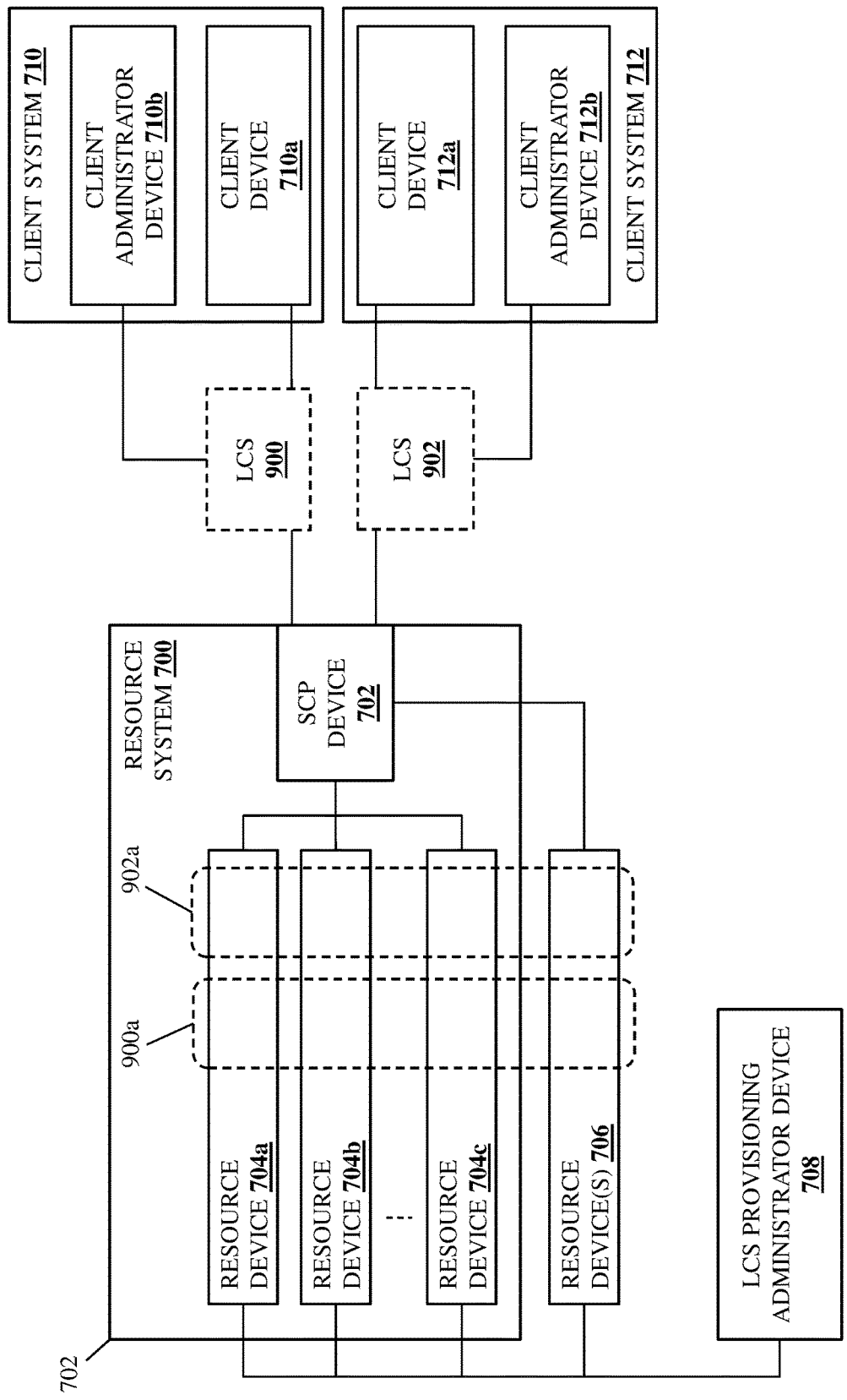
FIG. 11 is a schematic view illustrating an embodiment of the LCS resource policy enforcement system of FIG. 7 operating during the method of FIG. 8.

The method 800 then proceeds to block 810 where the orchestrator device applies the LCS policy to the subset of resource devices that were tagged with the client identifier to cause the LCS policy to be enforced on the client system and an LCS provisioning administrator device. With reference to FIG. 11, in an embodiment of block 810, the SCP device 702 may operate to provide an LCS 900 to the client system 710 using a "resource slice" 900a of the resource devices 704a-704c and 706, and the SCP device 702 may also operate to provide an LCS 902 to the client system 712 using a "resource slice" 902a of the resource devices 704a-704c and 706. As discussed above, each resource device 704a-704c and 706 (or portion thereof) in the resource slice 900a (e.g., a physical or virtual function presented as that resource device or portion thereof) may have been tagged with the client identifier for the client system 710 being provided the LCS 900, and at block 810 the SCP device 702 may apply the LCS policy for the LCS 900 that was identified at block 808 to the resource device 704a-704c and 706 (or portion thereof) in the resource slice 900a that are providing the LCS 900. Similarly, each resource device 704a-704c and 706 (or portion thereof) in the resource slice 902a 900a (e.g., a physical or virtual function presented as that resource device or portion thereof) may have been tagged with the client identifier for the client system 712 being provided the LCS 902, and at block 810 the SCP device 702 may apply the LCS policy for the LCS 902 that was identified at block 808 to the resource device 704a-704c and 706 (or portion thereof) in the resource slice 902a that are providing the LCS 902.

As discussed below, the application of the respective LCS policies to the resource devices that are tagged with the client identifiers for the client systems 710 and 712 that are being provided the LCSs 900 and 902 using those resource devices will provide for the enforcement of that LCS policy on the client systems 710 and 712 and the LCS provisioning administrator device 708. As such, any of the LCS security policies, LCS QoS policies, LCS lifecycle management policies, and/or other LCS policies discussed above may be applied to the resource devices 704a-704c and 706 included in the resource slice 900a (based on them being tagged with the client identifier for the client system 710) in order to have those LCS policies enforced on the client system 710 and the LCS provisioning administrator device 708. Similarly, any of the LCS security policies, LCS QoS policies, LCS lifecycle management policies, and/or other LCS policies discussed above may be applied to the resource devices 704a-704c and 706 included in the resource slice 902a (based on them being tagged with the client identifier for the client system 712) in order to have those LCS policies enforced on the client system 710 and the LCS provisioning administrator device 708.

In an embodiment, the enforcement of the LCS policies at block 810 may include allowing the LCS provisioning administrator device 708 to access statistical information that is generated by the resource devices 704a-704c and 706 during their operation to provide the LCSs 900 and 902, while preventing the LCS provisioning administrator device 708 from accessing any client data generated by the resource devices 704a-704c and 706 during their operation to provide the LCSs 900 and 902 (e.g., client data generated at the instruction of the client devices 710a and 712a). For example, LCS security policies and LCS QoS policies may be enforced at block 810 to prevent the LCS provisioning administrator device 708 from accessing any client data generated by the resource devices 704a-704c and 706 while providing the LCSs 900 and 902, while allowing the LCS provisioning administrator device 708 to access QoS data generated by the resource devices 704a-704c and 706 while providing the LCSs 900 and 902, and one of skill in the art in possession of the present disclosure will recognize that such an example may allow the LCS provisioning administrator device 708 to ensure that any QoS/SLA guarantees are being satisfied for the client systems 710 and 712. In a specific example, the statistical information/QoS data accessible by the LCS provisioning administrator device 708 may include telemetry data generated by the resource devices 704a-704c and 706 while providing the LCSs 900 and 902, but may not include telemetry data generated by the LCS itself (e.g., by an operating system that provides the LCS).

In another embodiment, the enforcement of the LCS policies at block 810 may include allowing the client administrator devices 710b and 712b to access statistical information that is generated by the resource devices 704a-704c and 706 during their operation to provide the LCSs 900 and 902, respectively, while possibly preventing the client administrator devices 710b and 712b from accessing client data generated by the resource devices 704a-704c and 706 during their operation to provide the LCSs 900 and 902 (client data generated at the instruction of the client devices 710a and 712a). For example, LCS security policies and LCS QoS policies may be enforced at block 810 to prevent the client administrator device 710b from accessing at least some of the client data generated by the resource devices 704a-704c and 706 while providing the LCS 900, while allowing the client administrator device 710b to access QoS data generated by LCS 900, and one of skill in the art in possession of the present disclosure will recognize that such an example may allow the client administrator device 710b to ensure that any QoS/SLA guarantees are being satisfied for the client systems 710. In a specific example, the statistical information/QoS data accessible by the client administrator device 710b may include telemetry generated by the LCS 900 (e.g., by an operating system that provides the LCS), but not telemetry data generated by the resource devices 704a-704c and 706 being used to provide that LCS.

In another embodiment, the enforcement of the LCS policies at block 810 may include allowing the client devices 710a and 712a to access client data that is generated by the resource devices 704a-704c and 706 during their operation to provide the LCSs 900 and 902, respectively, while preventing the client devices 710a and 712a from accessing data generated by the resource devices 704a-704c and 706 during their operation to provide the LCSs 900 and 902. For example, LCS security policies and LCS QoS policies may be enforced at block 810 to prevent the client device 710a from accessing telemetry generated by the resource devices 704a-704c and 706 while providing the LCS 900, while allowing the client device 710a to access client data generated by the resource devices 704a-704c and 706 while providing the LCS 900.

Furthermore, the enforcement of the LCS policies at block 810 may provide each of the LCS provisioning administrator device 708, the client administrator device 710b, and the client device 710a different abilities to control the LCS 900 and the resources used to provide that LCS 900. Similarly, the enforcement of the LCS policies at block 810 may provide each of the LCS provisioning administrator device 708, the client administrator device 712b, and the client device 712a different abilities to control the LCS 902 and the resource devices used to provide that LCS 902. For example, as discussed above, LCS lifecycle management policies may allow the LCS provisioning administrator device 708 to control lifecycle management operations on the resource devices 704a-704c and 706 used to provide the LCS 900 (but not lifecycle management operations on the LCS 900 itself), while allowing the client administrator device 710b or the client device 710a to control lifecycle management operations for the LCS 900 but not the resource devices 704a-704c and 706 used to provide the LCS 900.

As such, one of skill in the art in possession of the present disclosure will appreciate how role management may be applied to each of the LCS provisioning administrator device 708, the client administrator device 710b, and the client device 710a in order to restrict how those devices may interact with the LCS 900 and/or the resource devices used to provide it based on their identified roles that the LCS policies that define what those roles may do. As such, in some embodiments, the LCS policies described above may include roles defined for each of the each of the LCS provisioning administrator device 708, the client administrator device 710b, and the client device 710a, and may be referenced during the enforcement of those LCS policies to, for example, manage access to resource devices and/or their output based on the roles.

As discussed above, the enforcement of the LCS policies at block 810 may provide for the generation of alerts based on LCS policies such as, for example, when violations of LCS security policies occur, based on compliance with (or drift from) LCS QoS policies, in response to the performance of lifecycle management operations according the LCS lifecycle management policies, etc. For example, one of skill in the art in possession of the present disclosure will appreciate how such alerts may be configured to be generated to inform the LCS provisioning administrator device 708 when QoS for an LCS being provided to a client system is not being satisfied or when a lifecycle management operation has been requested or performed, to inform the client administrator device 710b when QoS for an LCS being consumed by a client system is not being satisfied or when an LCS security policy has been violated, etc.

In some embodiments, the enforcement of the LCS policies at block 810 may include providing LCSs via one or more dedicated Virtual Local Area Networks (VLANs). For example, the LCS 900 provided using the resource devices 704a-704c and 706 in the resource slice 900a may utilize an internal VLAN that is used to provide the LCS functionality for the LCS 900 between the resource devices 704a-704c and 706 to the SCP device 702, and an external VLAN that is used to provide the LCS functionality for the LCS 900 between the SCP device 702 and the client system 710. However, while two separate internal/external VLANs are described as being used to provide the LCS 900 to the client system 710 using the resource devices 704a-704c and 706, one of skill in the art in possession of the present disclosure will recognize that the use of a single VLAN to provide that LCS 900 (i.e., from the resource devices 704a-704c and 706 to the client system 710) will fall within the scope of the present disclosure as well. Furthermore, one of skill in the art in possession of the present disclosure will appreciate how separate VLAN(s) may be used to provide the LCS 902 to the client system 712 in order to isolate the LCSs 900 and 902 as discussed above.

As will be appreciated by one of skill in the art in possession of the present disclosure, the provisioning of LCSs using the VLAN(s) discussed above may enable the quarantining of tenants/client devices and/or LCSs in the event an LCS security policy is violated, with the embodiments that separate the internal VLAN and the external VLAN allowing separate internal and/or external quarantines in response to such security policy violations. Furthermore, while the use of VLANs has been described, one of skill in the art in possession of the present disclosure will appreciate that other non-VLAN technologies may be implemented that allow similar quarantine/security policy enforcement while remaining within the scope of the present disclosure as well. As such, one of skill in the art in possession of the present disclosure will appreciate how any or all of the resource devices being used to provide an LCS may be quarantined upon a violation of an LCS security policy for that LCS. Furthermore, LCS security policies may be adjusted based on the state of the environment. For example, upon a detection of a threat (e.g., a LCS security policy violation) in a particular segment of the LCS provided by particular resource devices, only those resource devices may be quarantined.

The method 800 then proceeds to decision block 812 where it is determined whether the subset of resource devices providing the LCS has been modified. In an embodiment, at decision block 812, the SCP device 702 may monitor to determine whether the resource devices being used to provide an LCS have changed. As discussed above, an orchestrator device may dynamically modify the resource devices being used to provide an LCS, and thus decision block 812 may allow the SCP device 702 to recognize any such modification it makes to the resource devices being used to provide an LCS. If, at decision block 812, it is determined that the subset of resource devices providing the LCS has not been modified, the method 800 returns to block 810. As such, the method 800 may loop such that the LCS policies applied to the current subset of resource devices 704a-704c and 706 that are being used to provide the LCSs 900 and 902 and that are tagged with the client identifiers causes the LCS policy for those LCSs 900 and 902 to be enforced on the client systems 710 and 712 and the LCS provisioning administrator device 708.

If, at decision block 812, it is determined that the subset of resource devices providing the LCS has been modified, the method 800 proceeds to block 814 where the orchestrator device tags each of the modified subset of resource devices being used to provide the LCS with the client identifier. In an embodiment, at block 814 and in response to determining that the subset of resource devices providing the LCS 900 and/or 902 has been modified, the SCP device 702 may operate to tag the modified subset of resource devices being used to provide the LCS 900 and/or 902 with the corresponding client identifier for the client system 710 and 712. For example, in the event a new resource device replaces the resource device 704a in providing the LCS 900, the SCP device 702 may operate to tag the new resource device being used to provide the LCS 900 with the client identifier for the client system 710, and untag the client identifier for the client system 710 from the resource device 704a. As such, following the modification to the subset of resource devices being used to provide the LCS 900, only the resource devices actually being used to provide the LCS 900 will be tagged with the client identifier for the client system 710.

The method 800 then proceeds to block 816 where the orchestrator device applies the LCS policy to the modified subset of resource devices tagged with the client identifier to cause the LCS policy to be enforced on the client system and the LCS provisioning administrator device. In an embodiment, at block 816, the SCP device 702 may apply the LCS policy to the modified subset of resource devices tagged with the client identifier to continue to cause the LCS policy to be enforced on the LCS provisioning administrator device 708, the client administrator device 710b, and the client device 710a substantially as described above. As such, the LCS policy for the LCS 900 will continued to be enforced as the resource devices used to provide that LCS 900 are modified.

Thus, systems and methods have been described that provide for the application of LCS policies for an LCS provided to a client system at a resource device level, allowing security policies, Quality of Service (QoS) policies, and/or other LCS policies to be enforced on different devices that are configured to access different functionality associated with the LCS, even as the resource devices that are used to provide that LCS are modified. For example, the LCS resource policy enforcement system of the present disclosure may include resource devices coupled to an LCS provisioning administrator device, a client system, and an orchestrator device coupled to the resource devices and the client system. The orchestrator device uses a first subset of the resource devices to provide an LCS to the client system based on a workload intent provided by the client system, associates the LCS with a client identifier for the client system, and tags each of the first subset of the resource devices being used to provide the LCS with the client identifier. The orchestrator device then identifies a LCS policy for the LCS and applies the LCS policy to each of the first subset of the resource devices tagged with the client identifier to cause the LCS policy to be enforced on the client system and the LCS provisioning administrator device.

As such, a workload intent provided by a client device may be linked to an LCS policy for the LCS that is composed to satisfy that workload intent, and that LCS policy may be enforced throughout the lifetime of that LCS to ensure security, QoS, lifecycle management, and/or other LCS factors are maintained between the internal LCS provisioning network and external LCS consumption network that are used to provide that LCS to a client device dynamically using a plurality of resource devices. Communications between the LCS and the resource devices used to provide it may be isolated in both the internal LCS provisioning network and external LCS consumption network to ensure security in multi-tenant/multi-client-device environments, with QoS information available for management by both an LCS provisioning administrator device and a client administrator device in order to enable LCS provisioning systems and client systems to ensure SLAs between the two are met. An orchestrator device (e.g., the SCP device in the examples above) may provide for isolation of LCSs via the presentment of the resource devices used to provide those LCS as the physical/virtual functions discussed above, with those physical/virtual functions tagged with the client identifier associated with the LCS they are providing, allowing for isolation on a per-LCS/client device basis, with such isolation maintained across the internal LCS provisioning network and external LCS consumption network. As such, dynamic security policies may be deployed in LCS provisioning systems, and may be updated based on changing tenant/client requests and/or behavior, as well as on changing resource devices in the LCS provisioning system.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Logically Composed System (LCS) resource policy enforcement system, comprising:
   a plurality of resource devices;
   a Logically Composed System (LCS) provisioning administrator device that is coupled to the plurality of resource devices;
   a first client system; and
   an orchestrator device that is coupled to the plurality of resource devices and the first client system, wherein the orchestrator device is configured to:

provide, to the first client system using a first subset of the plurality of resource devices and based on a workload intent provided by the first client system, a first LCS;

associate the first LCS with a first client identifier for the first client system;

tag, with the first client identifier, each of the first subset of the plurality of resource devices being used to provide the first LCS;

identify at least one first LCS policy for the first LCS; and apply the at least one first LCS policy to each of the first subset of the plurality of resource devices tagged with the first client identifier to cause the at least one first LCS policy to be enforced on the first client system and the LCS provisioning administrator device, wherein the enforcement of the at least one first LCS policy on the first client system and the LCS provisioning administrator device includes:

allowing a first subsystem in the first client system to access client data that is generated by the first LCS at the instruction of the first subsystem during the provisioning of the first LCS; and preventing the LCS provisioning administrator device from accessing the client data.

2. The system of claim 1, wherein the enforcement of the at least one first LCS policy on the first client system and the LCS provisioning administrator device includes:

allowing the LCS provisioning administrator device to access Quality of Service (QoS) telemetry data that is generated by the first subset of the plurality of resource devices during the provisioning of the first LCS; and preventing the first subsystem in the first client system from accessing the QoS telemetry data.

3. The system of claim 2, wherein the first subsystem in the first client system includes a first client device and the first client system also includes a first client administrator device, and wherein the enforcement of the at least one first LCS policy on the first client administrator device includes allowing the first client administrator device to access the QoS telemetry data.

4. The system of claim 1, wherein the orchestrator device is configured to:

provide, using a second subset of the plurality of resource devices subsequent to using the first subset of the plurality of resource devices, the first LCS;

tag, with the first client identifier, each of the second subset of the plurality of resource devices being used to provide the first LCS;

remove the tag from any of the first subset of the plurality of resource devices that are not included in the second subset of the plurality of resource devices; and apply the at least one first LCS policy to each of the second subset of the plurality of resource devices tagged with the first client identifier to cause the at least one first LCS policy to be enforced on the first client system and the LCS provisioning administrator device.

5. The system of claim 1, wherein the first subsystem in the first client system includes a first client device and the firstclient subsystem also includes a first client administrator device, and wherein the enforcement of the at least one first LCS policy on the first client administrator device includes preventing the first client administrator device from accessing the client data that is generated by the first LCS at the instruction of the first subsystem during the provisioning of the first LCS.

6. The system of claim 1, wherein the enforcement of the at least one first LCS policy includes the orchestrator device providing the first LCS to the first client system using a first Virtual Local Area Network (VLAN) that is different than a second VLAN that is used by the orchestrator device to provide a second LCS to a second client system.

7. An Information Handling System (IHS), comprising:
a processing system; and
a memory system that is coupled to the processing system and that includes instructions that, when executed by the processing system, cause the processing system to provide an orchestrator engine that is configured to:

provide, to a first client system using a first subset of a plurality of resource devices and based on a workload intent provided by the first client system, a first LCS;

associate the first LCS with a first client identifier for the first client system;

tag, with the first client identifier, each of the first subset of the plurality of resource devices being used to provide the first LCS;

identify at least one first LCS policy for the first LCS; and apply the at least one first LCS policy to each of the first subset of the plurality of resource devices tagged with the first client identifier to cause the at least one first LCS policy to be enforced on the first client system and an LCS provisioning administrator device that is coupled to the plurality of resource devices, wherein the enforcement of the at least one first LCS policy on the first client system and the LCS provisioning administrator device includes:

allowing a first subsystem in the first client system to access client data that is generated by the first LCS at the instruction of the first subsystem during the provisioning of the first LCS; and preventing the LCS provisioning administrator device from accessing the client data.

8. The IHS of claim 7, wherein the enforcement of the at least one first LCS policy on the first client system and the LCS provisioning administrator device includes:

allowing the LCS provisioning administrator device to access Quality of Service (QoS) telemetry data that is generated by the first subset of the plurality of resource devices during the provisioning of the first LCS; and preventing the first subsystem in the first client system from accessing the QoS telemetry data.

9. The IHS of claim 8, wherein the first subsystem in the first client system includes a first client device and the first client system also includes a first client administrator device, and wherein the enforcement of the at least one first LCS policy on the first client administrator device includes allowing the first client administrator device to access the QoS telemetry data.

10. The IHS of claim 7, wherein the orchestrator engine is configured to:

provide, using a second subset of the plurality of resource devices subsequent to using the first subset of the plurality of resource devices, the first LCS;

tag, with the first client identifier, each of the second subset of the plurality of resource devices being used to provide the first LCS;

remove the tag from any of the first subset of the plurality of resource devices that are not included in the second subset of the plurality of resource devices; and apply the at least one first LCS policy to each of the second subset of the plurality of resource devices tagged with the first client identifier to cause the at least one first LCS policy to be enforced on the first client system and the LCS provisioning administrator device.

11. The IHS of claim 7, wherein the first subsystem in the first client system includes a firstclient device and the first client system also includes a first client administrator device, and wherein the enforcement of the at least one first LCS policy on the first client administrator device includes preventing the first client administrator device from accessing the client data that is generated by the first LCS at the instruction of the first subsystem during the provisioning of the first LCS.

12. The IHS of claim 7, wherein the enforcement of the at least one first LCS policy includes the orchestrator engine providing the first LCS to the first client system using a first Virtual Local Area Network (VLAN) that is different than a second VLAN that is used by the orchestrator engine to provide a second LCS to a second client system.

13. The IHS of claim 7, wherein the enforcement of the at least one first LCS policy includes the orchestrator engine quarantining the first subset of the plurality of resource devices.

14. A method for enforcing a Logically Composed System (LCS) policy on resource devices used to provide an LCS, comprising:
providing, by an orchestrator device to a first client system using a first subset of a plurality of resource devices and based on a workload intent provided by the first client system, a first LCS;
associating, by the orchestrator device, the first LCS with a first client identifier for the first client system;
tagging, by the orchestrator device with the first client identifier, each of the first subset of the plurality of resource devices being used to provide the first LCS;
identifying, by the orchestrator device, at least one first LCS policy for the first LCS; and
applying, by the orchestrator device, the at least one first LCS policy to each of the first subset of the plurality of resource devices tagged with the first client identifier to cause the at least one first LCS policy to be enforced on the first client system and an LCS provisioning administrator device that is coupled to the plurality of resource devices, wherein the enforcement of the at least one first LCS policy on the first client system and the LCS provisioning administrator device includes:
allowing a first subsystem in the first client system to access client data that is generated by the first LCS at the instruction of the first subsystem during the provisioning of the first LCS; and
preventing the LCS provisioning administrator device from accessing the client data.

15. The method of claim 14, wherein the enforcement of the at least one first LCS policy on the first client system and the LCS provisioning administrator device includes:
allowing the LCS provisioning administrator device to access Quality of Service (QoS) telemetry data that is generated by the first subset of the plurality of resource devices during the provisioning of the first LCS; and
preventing the first subsystem in the first client system from accessing the QoS telemetry data.

16. The method of claim 15, wherein the first subsystem in the first client system includes a first client device and the first client system also includes a first client administrator device, and wherein the enforcement of the at least one first LCS policy on the first client administrator device includes allowing the firstclient administrator device to access the QoS telemetry data.

17. The method of claim 14, further comprising:
providing, by the orchestrator device, using a second subset of the plurality of resource devices subsequent to using the first subset of the plurality of resource devices, the first LCS;
tagging, by the orchestrator device with the first client identifier, each of the second subset of the plurality of resource devices being used to provide the first LCS;
removing, by the orchestrator device, the tag from any of the first subset of the plurality of resource devices that are not included in the second subset of the plurality of resource devices; and
applying, by the orchestrator device, the at least one first LCS policy to each of the second subset of the plurality of resource devices tagged with the first client identifier to cause the at least one first LCS policy to be enforced on the first client system and the LCS provisioning administrator device.

18. The method of claim 14, wherein the first subsystem in the first client system includes a firstclient device and the first client system also includes a first client administrator device, and wherein the enforcement of the at least one first LCS policy on the first client administrator device includes preventing the first client administrator device from accessing the client data that is generated by the first LCS at the instruction of the first subsystem during the provisioning of the first LCS.

19. The method of claim 14, wherein the enforcement of the at least one first LCS policy includes the orchestrator device providing the first LCS to the first client system using a first Virtual Local Area Network (VLAN) that is different than a second VLAN that is used by the orchestrator device to provide a second LCS to a second client system.

20. The method of claim 14, wherein the enforcement of the at least one first LCS policy includes the orchestrator device quarantining the first subset of the plurality of resource devices.

* * * * *